(12) United States Patent
Verma et al.

(10) Patent No.: US 8,442,985 B2
(45) Date of Patent: May 14, 2013

(54) SYSTEM FOR REQUIREMENT IDENTIFICATION AND ANALYSIS BASED ON CAPABILITY MODE STRUCTURE

(75) Inventors: Kunal Verma, Sunnyvale, CA (US); Reymonrod G. Vasquez, San Jose, CA (US); Alex Kass, Palo Alto, CA (US); Santonu Sarkar, Bangalore (IN); Vibhu S. Sharma, Aligarh UP (IN)

(73) Assignee: Accenture Global Services Limited (IE)

( * ) Notice: Subject to any disclaimer, the term of this patent is extended or adjusted under 35 U.S.C. 154(b) by 110 days.

(21) Appl. No.: 13/029,705

(22) Filed: Feb. 17, 2011

(65) Prior Publication Data

US 2011/0208734 A1    Aug. 25, 2011

(30) Foreign Application Priority Data

Feb. 19, 2010    (IN) .............................. 435/CHE/2010

(51) Int. Cl.
   *G06F 17/30*    (2006.01)
(52) U.S. Cl.
   USPC ........................................................ 707/748
(58) Field of Classification Search .................. 707/748, 707/802, 803, 805; 704/9
   See application file for complete search history.

(56) References Cited

U.S. PATENT DOCUMENTS

| | | | |
|---|---|---|---|
| 5,369,575 A | 11/1994 | Lamberti et al. | |
| 5,774,833 A | 6/1998 | Newman | |
| 5,995,920 A | 11/1999 | Carbonell et al. | |
| 6,139,201 A | 10/2000 | Carbonell et al. | |
| 6,167,370 A | 12/2000 | Tsourikov et al. | |
| 6,343,297 B1 | 1/2002 | D'Anjou et al. | |
| 6,510,425 B1 | 1/2003 | Okamoto et al. | |
| 6,681,383 B1 | 1/2004 | Pastor et al. | |
| 6,715,130 B1 | 3/2004 | Eiche et al. | |
| 6,886,115 B2 | 4/2005 | Kondoh et al. | |
| 7,111,076 B2 | 9/2006 | Abjanic et al. | |
| 7,146,422 B1 | 12/2006 | Marlatt et al. | |
| 7,337,102 B2 | 2/2008 | Mosterman | |
| 7,500,185 B2 | 3/2009 | Hu | |
| 7,536,711 B2 | 5/2009 | Miyashita et al. | |
| 7,593,891 B2 * | 9/2009 | Kornegay et al. | ............... 705/38 |
| 7,647,349 B2 | 1/2010 | Hubert et al. | |

(Continued)

FOREIGN PATENT DOCUMENTS

EP    1 672 547 A1    6/2006

OTHER PUBLICATIONS

Boddu, R. et al., "RETNA: From Requirements to Testing in a Natural Way," Proceedings of the 12th IEEE International Requirements Engineering Conference, 2004, 10 pages.

(Continued)

*Primary Examiner* — Cheryl Lewis
(74) *Attorney, Agent, or Firm* — Brinks Hofer Gilson & Lione

(57) ABSTRACT

A textual analysis system is configured to compare textual content of textual statements. The textual analysis system is configured to score the textual content of a first textual statement and a second textual statement. Based on the score, the textual analysis system may determine a level of correspondence between the first textual statement and the second textual statement. The textual analysis system is configured to generate an interactive visual representation of the correspondence levels between the first statement and the second statement. The visual representation may be transmitted to a display.

22 Claims, 13 Drawing Sheets

U.S. PATENT DOCUMENTS

| | | | |
|---|---|---|---|
| 7,694,222 | B2 | 4/2010 | Steen et al. |
| 7,725,923 | B2 | 5/2010 | Miyashita et al. |
| 7,752,094 | B2* | 7/2010 | Davidson et al. ............... 705/31 |
| 7,769,570 | B2 | 8/2010 | Mosterman |
| 7,774,743 | B1 | 8/2010 | Sanchez et al. |
| 7,877,737 | B2 | 1/2011 | Austin et al. |
| 7,975,220 | B2 | 7/2011 | Hattori |
| 2002/0065857 | A1 | 5/2002 | Michalewicz et al. |
| 2002/0147763 | A1 | 10/2002 | Lee et al. |
| 2002/0165717 | A1 | 11/2002 | Solmer et al. |
| 2002/0184397 | A1 | 12/2002 | Cooper |
| 2003/0149692 | A1 | 8/2003 | Mitchell |
| 2003/0172135 | A1 | 9/2003 | Bobick et al. |
| 2003/0220853 | A1* | 11/2003 | Back et al. ....................... 705/29 |
| 2004/0025110 | A1 | 2/2004 | Hu |
| 2004/0030540 | A1 | 2/2004 | Ovil et al. |
| 2004/0034651 | A1 | 2/2004 | Gupta et al. |
| 2004/0039734 | A1 | 2/2004 | Judd et al. |
| 2004/0083092 | A1 | 4/2004 | Valles |
| 2004/0153992 | A1 | 8/2004 | Molina-Moreno et al. |
| 2004/0215443 | A1 | 10/2004 | Hatton |
| 2005/0108001 | A1 | 5/2005 | Aarskog |
| 2005/0216882 | A1 | 9/2005 | Sundararajan et al. |
| 2006/0041579 | A1 | 2/2006 | Miyashita et al. |
| 2006/0085451 | A1 | 4/2006 | Pal et al. |
| 2006/0085489 | A1 | 4/2006 | Tomic et al. |
| 2006/0190804 | A1 | 8/2006 | Yang |
| 2006/0265646 | A1 | 11/2006 | Girolami |
| 2006/0282266 | A1 | 12/2006 | Lopez-Barquilla et al. |
| 2007/0143329 | A1 | 6/2007 | Vigen |
| 2007/0244859 | A1 | 10/2007 | Trippe et al. |
| 2007/0294230 | A1 | 12/2007 | Sinel et al. |
| 2008/0033897 | A1 | 2/2008 | Lloyd |
| 2009/0138793 | A1 | 5/2009 | Verma et al. |

OTHER PUBLICATIONS

Basili, V. R. et al., "Comparing the Effectiveness of Software Testing Strategies," IEEE Transactions on Software Engineering, vol. SE-13, No. 12, 1987, pp. 1278-1296.

Luo, L., "Software Testing Techniques: Technology Maturation and Research Strategy," Class Report for 17-939A, Institute for Software Research International, Carnegie Mellon University, 20 pages.

Sutton, S. M. et al., "Text2Test: Automated Inspection of Natural Language Use Cases," IBM Search Report, Computer Science, 2009, 11 pages.

Anandha Mala, G.S. et al., "Automatic Construction of Object-Oriented Design Models [UML Diagrams] from Natural Language Requirements Specification," PRICAI, 2006, pp. 1155-1159.

Anderson, T. et al., "On Formal Support for Industrial-Scale Requirements Analysis," Departments of Computing Science, University of Newcastle upon Tyne, UK, pp. 426-451.

ANTLR, URL: printed from the internet at <http://www.antlr.org>, on May 18, 2010, 2 pages.

Apache OpenNLP, The Apache Software Foundation, 2010, printed from the internet at <http://incubator.apache.org.opennlp/index.html> on Aug. 22, 2011, 2 pages.

Appfuse, 2008, printed from the internet at <http://appfuse.org/display/APF/Home> on Aug. 16, 2011, 2 pages.

Baader, F. et al., "Description Logics," Theoretical Computer Science, TU Dresden, Germany, 40 pages.

Baader, F. et al., Chapter 3, Description Logics, Elsevier, 2007, 47 pages.

Basler, M. et al., "Introducing the Java Pet Store 2.0 Application," 2007, printed from the internet at <http://java.sun.com/jsp.utils/PrintPage.jsp?url=http%3A%2F%2Fjava.sun.com%2Fdevelo . . . > on Aug. 17, 2011, 10 pages.

Boehm, B. W., "Understanding and Controlling Software Costs," IEEE Transactions on Software Engineering, vol. 14, No. 10, 1988, pp. 1462-1477.

Boehm, B. et al., "Identifying Quality-Requirement Conflicts," IEEE Software, vol. 13, No. 2, IEEE Computer Society Press, Los Alamitos, 1996, pp. 25-35.

Borland Software Corporation, "Mitigating Risk with Effective Requirements Engineering," Apr. 2005, 14 pages.

Brandozzi, M. et al., "Transforming Goal Oriented Requirement Specifications into Architecture Prescriptions," 8 pages.

Crain, A., "The Simple Artifacts of Analysis and Design," IBM Software Group, 2004, printed from the internet at <http://www.ibm.com/developerworks/rational/library/4871.html> on Aug. 18, 2011, 7 pages.

Curtis, Dr. B., Best Practices for Requirements Development and Management, Borland Software Corporation, 2005, 36 pages.

Dashofy, E. M. et al., "A Comprehensive Approach for the Development of Modular Software Architecture Description Languages," ACM Transactions on Software Engineering and Methodology, vol. 14, No. 2, 2005, pp. 199-245.

Duan, M., "Ravenflow Seeks to Eliminate Software Ambiguity, Errors," Silicon Valley / San Joes Business Journal, Nov. 17, 2006, 2 pages.

European Search Report dated Jul. 16, 2010 for EP Application No. 10000780.6, 8 pages.

Extended European Search Report dated Nov. 4, 2009 for EP Application No. 08020182.5, 9 pages.

Fantechi, A. et al., "A Content Analysis Technique for Inconsistency Detection in Software Requirements Documents," Dipartimento di Sistemi e Informatica Universita degli Studi di Firenzi, Italy, 12 pages.

Glass, R. L., Facts and Fallacies of Software Engineering, Addison Wesley, copyright 2003, 150 pages.

Grunbacher, P. et al., "Reconciling Software Requirements and Architectures: The CBSP Approach," Proceedings of the 5th IEEE International Symposium on Requirements Engineering, Toronto, Canada, 2001, 10 pages.

Hall, J. G. et al., "Relating Software Requirements and Architectures using Problem Frames," The Open University, UK, 8 pages.

Hooks, I. F., "Managing Requirements," Crosstalk, The Journal of Defense Software Engineering, vol. 17, No. 8, Aug. 2004, 8 pages.

IBM DeveloperWorks: Rational Software Architect, printed from the internet at <http://www.ibm.com/developerworks/rational/products/rsa/> on Aug. 18, 2011, 2 pages.

IEEE Recommended Practice for Architectural Description of Software-Intensive Systems, The Institute of Electrical and Electronics Engineering, Inc., 2000, 29 pages.

IEEE Recommended Practice for Software Requirement Specifications, IEEE/ANSI Standard 830-1998, Institute of Electrical and Electronics Engineers, 1998, 39 pages.

IEEE Standard Glossary of Software Engineering Terminology, IEEE Std. 610.12-1990, Standards Coordinating Committee of the Computer Society of the IEEE, New York, Sep. 1990, 84 pages.

"Information Technology—Open Distributed Processing—Reference model: Architecture," International Standard, ISO/IEC 10746-3, 1st Ed. 1996, 68 pages.

"Information technology—Open Distributed Processing—Reference model: Foundations" ISO/IEC 10746-2, 1st Ed., 1996, 28 pages.

Jain, P. et al., "Automated Review of Natural Language Requirements Documents: Generating Useful Warnings with User-extensible Glossaries Driving a Simple State Machine," ISEC '09, ACM, 2009, pp. 37-45.

Jena—A Semantic Web Framework for Java, printed from the internet at <http://jena.sourceforge.net>, last retrieved on Oct. 10, 2008, 1 page.

Keshav, R. et al., "Towards a Taxonomy of Architecture Integration Strategies," the 3rd International Software Architecture Workshop, 1998, 4 pages.

Kruchten, P., "An Ontology of Architectural Design Decisions in Software-Intensive Systems," 2004, 8 pages.

Kruchten, P., "Architectural Blueprints—The "4+1" View Model of Software Architecture," IEEE Software, vol. 12, No. 6, 1995, 15 pages.

Lami, G. et al., "An Automatic Tool for the Analysis of Natural Langauge Requirements," published as Technical Report 2004-TR-40, Consiglio Nazionale delle Ricerche, Instituto di Scienza e Tecnologie dell'Informazione 'A.Faedo', 2004, 21 pages.

Lami, G., "QuARS: A Tool for Analyzing Requirements," Software Engineering Measurement and Analysis Initiative, Technical Report, 2005, 46 pages.
Lau, K-K. et al., "A Taxonomy of Software Components Models," Proceedings of the 2005 31st EUROMICRO Conference on Software Engineering and Advanced Applications, IEEE, 2005, 8 pages.
Liu, D. et al., "Natural Language Requirements Analysis and Class Model Generation Using UCDA," IEA/AIE, Springer-Verlag, 2004, pp. 295-304.
Maiden, N. A. et al., "Acquiring COTS Software Selection Requirements," IEEE Software, 1998, pp. 46-56.
Mattsson, A. et al., "Modelling Architectural Design Rules in UML," Proceedings of EMMSAD, 2008, pp. 71-79.
Medvidovic, N. et al., "A Classification and Comparison Framework for Software Architecture Description Languages," IEEE Transactions on Software Engineering, vol. 26, No. 1, 2000, pp. 70-93.
Mehta, N. R. et al., "Towards a Taxonomy of Software Connectors," 10 pages.
"Modeling," Software Development Times, Jun. 1, 2007, 2 pages.
Morisio, M. et al., "Definition and Classification of COTS: A Proposal," ICCBSS, Orlando, FL, 2002, 10 pages.
OWL Web Ontology Language Overview, W3C, available from http://www.w3.org/TR/owl-features/, last retrieved on Oct. 10, 2008, 13 pages.
Partial European Search Report dated Aug. 14, 2009 for EP Application No. 08020182.5, 6 pages.
Raven Professional Includes Five New Modules, Computer Magazine, Nov. 2006, p. 85.
Raven Software, URL: available at www.ravensoft.com last retrieved Aug. 26, 2010, 1 page.
Ravenflow website, 2005-2006, http://www.ravenflow.com, last accessed on Jan. 30, 2008, 71 pages.
Rech, J. et al., "Intelligent Assistance in German Software Development: A Survey," 9 pages.
Robinson, W. N. et al., "Requirements Interaction Management," ACM Computing Surveys, vol. 35, No. 2, Jun. 2003, pp. 1-59.
Robinson, W. N. et al., "Requirements Interaction Management," Georgia State University, Department of Computer Information Systems Working Paper 99-7, Aug. 30, 1999, 68 pages.
Rubinstein, D., "Quoth the Ravenflow: Drag-and_Drop Nevermor: Requirments Suite Generates UML Diagrams from Plain Text," Software Development Times, Mar. 15, 2006, Issue No. 146, 1 page.
Schindler, E., "Learning to Speak 'User'," Digital Producer Magazine, Mar. 2006, 2 pages.
Schmerl, B. et al., "AcmeStudio: Supporting Style-Centered Architecture Development," In Proc. 2004 International Conference on Software Engineering, Edinburgh, Scotland, 2004, 2 pages.
Schmidt, D., "Model-Driven Engineering," IEEE Computer Society, 2006, pp. 25-31.
Selic, B. "The Pragmatics of Model-Driven Development," IEEE Software, 2003, pp. 19-25.
Shahin, M. et al., "Improving Understandability of Architecture Design through Visualization of Architectural Design Decision," SHARK '10, ACM, 2010, 8 pages.
Skyway Software, printed from the internet at <http://www.skywaysoftware.com/> on Aug. 22, 2011, 3 pages.
The Declaration of Independence: Six Principles to Benefit You and Your Agile Organization, Better Software, www.StickMinds.com, Jun. 2006, pp. 24 and 36.
The Protege Ontology Editor and Knowledge Acquisition System, printed from the internet at <http://protege.stanford.edu/> on Aug. 16, 2011, 2 pages.
Tolvanen, J-P. et al., "Defining Domain-Specific Modeling Languages to Automate Product Derivation: Collected Experiences," SPLC 2005, pp. 198-209.
van Lamsweerde, A. et al., "Managing Conflicts in Goal-Driven Requirements Engineering," IEEE Transactions on Software Engineering, Special Issue on Managing Inconsistency in Software Development, Nov. 1998, pp. 1-21.
Verma, K. et al., "Requirements Analysis Tool: A Tool for Automatically Analyzing Software Requirements Documents," ISWC 2008, Springer-Verlag, 2008, pp. 751-763.
Wiegers, K. E., Software Requirements, Chapters 1-13, Microsoft Press, Redmond, 2003, 262 pages.
Wiegers, K. E., Software Requirements, Chapters 14—Appendix D, Microsoft Press, Redmond, 2003, 278 pages.
Wilson, W. M. et al., "Automatic Quality Analysis of Natural Language Requirement Specification," NASA, The Goddard Space Flight Center's Software Assurance Technology Center, http://satc.gsfc.nasa.gov/support/PNSQC-_OCT96/phq.html, dated Oct. 1996, pp. 1-19.
Yacc, URL: available at http://dinosaur.compilertools.net/yaac, last retrieved Apr. 29, 2010, 24 pages.
Yoo, J. et al., "A Formal Software Requirements Specification Method for Digital Nuclear Plant Protection Systems," The Journal of Systems and Software, vol. 74, 2005, pp. 73-83.
Young, R.R. 2000 Effective Requirements Practices, Addison-Wesley Longman Publishing Co, Inc. 2001, 387 pages.
Zimmermann, O. et al., "Managing Architectural Decision Models with Dependency Relations, Integrity Constraints, and Production Rules," 36 pages.
Extended European Search Report for EP Application 11001270.5-1238, Dated Apr. 20, 2011, 6 pp.
Statement in Accordance with the Notice from the European Patent Office Dated Oct. 1, 2007 Concerning Business Methods sent with Extended European Search Report, Nov. 2007, 2 pp.
Baader, F. et al., "Description Logics," Reasoning Web. Semantic Technologies for Information Systems, 2009, 40 pages.
Brandozzi, M. et al., "Transforming Goal Oriented Requirement Specifications into Architecture Prescriptions," Proceedings STRAW '01, ICSE 2001, 8 pages.
Cunning, S. J. et al., "Test Scenario Generation from a Structured Requirements Specification," IEEE Conference and Workshop on Engineering of Computer-Based Systems, ecbs, 1997, 7 pages.
de Marneffe, M-C. et al., "Generating Typed Dependency Parses from Phrase Structure Parses," LRCE, 2006, 6 pages.
Fabbrini, F. et al., "The Linguistic Approach to the Natural Language Requirements Quality: Benefit of the use of an Automatic Tool," SEW '01 Proceedings of the 26th Annual NASA Goddard Software Engineering Workshop, 2001, 9 pages.
Fantechi, A. et al., "A Content Analysis Technique for Inconsistency Detection in Software Requirements Documents," WER, 2005, pp. 245-256.
Gnesi, S. et al., "An Automatic Tool for the Analysis of Natural Language Requirements," Comput. Syst. Sci. Eng., 2005, 13 pages.
Hall, J. G. et al., "Relating Software Requirements and Architectures using Problem Frames," Proceedings of the IEEE Joint International Conference on Requirements Engineering (RE '02), 2002, 8 pages.
Lin, D., "Dependency-Based Evaluation of MINIPAR," Text, Speech, and Language Technology 1, vol. 20, Treebanks, Part II, 2003, pp. 317-329.
Lin, D., "An Information-Theoretic Definition of Similarity," Proceedings of the 15th International Conference on Machine Learning 1, 1998, pp. 296-304.
Luisa, M. et al., "Market Research for Requirements Analysis Using Linguistic Tools," Requirements Engineering, vol. 9, No. 1, 2002, 26 pages.
Luo, L., "Software Testing Techniques: Technology Maturation and Research Strategy," Class Report for 17-939A, Institute for Software Research International, Carnegie Mellon University, 2009, 20 pages.
Mehta, N. R. et al., "Towards a Taxonomy of Software Connectors," In Proceedings of the 22nd International Conference on Software Engineering, 2000, pp. 178-187.
Offutt, J. et al., "Generating Tests from UML Specifications," U.S. National Science Foundation under grant CCR-98-04111 and Rockwell Collins, Inc., Robert Franc and Bernhard Rurape (Eds.), '99, LNCS 1723, 1999, pp. 416-429.
Paolucci, M. et al., "Semantic Matching of Web Services Capabilities," International Semantic Web Conference (ISWC), Sandinia, Italy, Jun. 9-12, 2002, pp. 333-347.
Pyysalo, S. et al., "Analysis of Link Grammar on Biomedical Dependency Corpus Targeted at Protein-Protein Interactions," JNLPBA '04 Proceedings of the International Joint Workshop on Natural Language Processing in Biomedicine and its Applications, 2004, pp. 15-21.

Rech, J. et al., "Intelligent Assistance in German Software Development: A Survey," IEEE Software, vol. 24, No. 4, 2007, pp. 72-79.
Zimmermann, O. et al., "Managing Architectural Decision Models with Dependency Relations, Integrity Constraints, and Production Rules," Journal of Systems and Software, vol. 82, No. 8, Aug. 2009, 36 pages.
Alani, H. et al., "Automatic Ontology-Based Knowledge Extraction from Web Documents," IEEE Intelligent Systems, 2003, pp. 14-21.
Baral, C. et al., "Using AnsProlong with Link Grammar and WordNet for QA with deep reasoning," 9th International Conference on Information Technology, IEEE Computer Society, 2006, 4 pages.
Biswal, B. N. et al., "A Novel Approach for Scenario-Based Test Case Generation," International Conference on Technology, IEEE Computer Society, 2008, pp. 244-247.
Cunning, S. J. et al., "Test Scenario Generation from a Structured Requirements Specification," IEEE Conference and Workshop on Engineering of Computer-Based Systems, 7 pages.
Dahab, M. Y. et al., "TextOntoEx: Automatic ontology construction from natural English text," Expert Systems with Applications, vol. 34, 2008, pp. 1474-1480.
Daneva, M., "ERP Requirements Engineering Practice: Lessons Learned," IEEE Software, 2004. pp. 26-33.
Daneva, M., "Establishing Reuse Measurement Practices in SAP Requirements Engineering," IEEE, 2000, 10 pages.
de Marneffe, M-C. et al., "Generating Typed Dependency Parses from Phrase Structure Parses," LRCE, 6 pages.
de Marneffe, M-C. et al., "Stanford typed dependencies manual," Sep. 2008 (Revised for Stanford Parser v. 1.6.2, 2010), 20 pages.
Deeptimahanti, D. K. et al., "An Automated Tool for Generating UML Models from Natural Language Requirements," IEEE/ACM International Conference on Automated Software Engineering, IEEE Computer Society, 2009, pp. 680-682.
Deeptimahanti, D. K. et al., "Semi-automatic Generation of UML Models from Natural Language Requirements," India Software Engineering Conference, 2011, pp. 165-174.
Dickinson, I., "Jena Ontology API," 2009, printed from the internet at <http://jena.sourceforge.net/ontology/> on Feb. 21, 2012, 29 pages.
Egyed, A., "Scalable Consistency Checking between Diagrams—The ViewIntegra Approach," Proceedings of the 16th IEEE International Conference on Automated Software Engineering, USA: San Diego, 2001, 4 pages.
Fabbrini, F. et al., "The Linguistic Approach to the Natural Language Requirements Quality: Benefit of the use of an Automatic Tool," 9 pages.
Gervasi, V. et al., "Reasoning About Inconsistencies in Natural Lanuguage Requirements," ACM Transactions on Software Engineering and Methodology, vol. 14, No. 3, 2005, pp. 277-330.
Gnesi, S. et al., "An Automatic Tool for the Analysis of Natural Language Requirements," Comput. Systt. Sci. Eng., 13 pages.
Hayes, J. H. et al., "Advancing Candidate Link Generation for Requirements Tracing: The Study of Methods," IEEE Transactions on Software Engineering, vol. 32, No. 1, 2006, pp. 4-19.
"IEEE Standard for Software and System Test Documentation," IEEE Standard 829-2008, IEEE Computer Society, 2008, 132 pages.
Ilieva, M. G. et al., "Automatic Transition of Natural Language Software Requirements Specification into Formal Presentation," Natural Language and Processing Information Systems, Lecture Notes in Computer Science, vol. 3513, copyright Springer-Verlag, 2005, pp. 392-397.
Jirapanthong, W. et al., "XTraQue: traceability for product line systems," Software and Systems Modeling, vol. 8, 2009, pp. 117-144.
Kof, L., et al., "Faster from Requirements Documents to System Models: Interactive Semi-Automatic Translation with a tool that is learning on the fly," Requirements Engineering Efficency Workshop, 17th International Working Conference on Requirements Engineering: Foundation for Software Quality, 2011, 41 pages.
Kosindrdecha, N. et al., "A Test Generation Method Based on State Diagram," Journal of Theoretical and Applied Information Technology, 2010, pp. 28-44.
Li, L. et al., "A Software Framework for Matchmaking Based on Semantic Web Technology," in WWW, 2003, pp. 331-339.

Li, Y. et al., "Sentence Similarity Based on Semantic Nets and Corpus Statistics," IEEE Transactions on Knowledge and Data Engineering, vol. 18, No. 8, 2006, pp. 1138-1150.
Lin, D., "Dependency-Based Evaluation of MINIPAR," In Workshop on the Evaluation of Parsing Systems, Ch. 18, pp. 317-329.
Lin, D., "An Information-Theoretic Definition of Similarity," 9 pages.
Litvak, B. et al., "Behavioral Consistency Validation of UML Diagrams," Proceedings of the First International Conference on Software Engineering and Formal Methods, IEEE Computer Society, 2003, 8 pages.
Luisa, M. et al., "Market Research for Requirements Analysis Using Linguistic Tools," Requirements Engineering, vol. 9, No. 1, 26 pages.
Marcus, M. P. et al., "Building a Large Annotated Corpus of English: the Penn Treebank," Computational Linguistics, 1993, 22 pages.
Mihalcea, R. et al., "Corpus-based and Knowledge-based Measures of Text Semantic Similarity," in American Associate for Artificial Intelligence, 2006, 6 pages.
Miller, G. A., "Wordnet: A Lexical Database for English," Communications of the ACM, vol. 38, No. 11, 1995, pp. 39-41.
Nanduri, S. et al., "Requirements Validation via Automated Natural Language Parsing," Proceedings of the 28th Annual Hawaii International Conference on System Sciences, IEEE, 1995, pp. 362-368.
Nebut, C. et al., "Automatic Test Generation: A Use Case Driven Approach," IEEE Transactions on Software Engineering, vol. 32, No. 3, 2006, pp. 140-155.
Neill, C. J. et al., "Requirements Engineering: The State of the Practice," IEEE Software, IEEE Computer Society, vol. 20, No. 6, 2003, pp. 40-45.
Offutt, J. et al., "Generating Tests from UML Specifications," U.S. National Science Foundation under grant CCR-98-04111 and Rockwell Collins, Inc., 14 pages.
Paolucci, M. et al., "Semantic Matching of Web Services Capabilities," 15 pages.
Phyu, A. L. L. et al., "Domain Adaptive Information Extraction Using Link Grammar and WordNet," Fifth International Conference on Creating, Connecting, and Collaborating through Computing, IEEE Computer Society, 2007, 7 pages.
Porter, M. F., "An Algorithm for Suffix Stripping," Program, vol. 14, No. 3, 1980, pp. 130-137.
Pyysalo, S. et al., "Analysis of Link Grammar on Biomedical Dependency Corpus Targeted at Protein-Protein Interactions," pp. 15-21.
RosettaNet website, 2012, printed from the internet at <http://www.rosettanet.org/> on Feb. 21, 2012, 2 pages.
Ryan, K., "The Role of Natural Language in Requirements Engineering," IEEE, 1992, pp. 240-242.
Sharma, V. S. et al., "Extracting High-Level Functional Design from Software Requirements," 16th Asia-Pacific Software Engineering Conference, IEEE Computer Society, 2009, pp. 35-42.
Sinha, A. et al., "Text2Test: Automated Inspection of Natural Language Use Cases," 2010 Third International Conference on Software Testing, Verification and Validation, IEEE Computer Society, 2010, pp. 155-162.
Sleator, D. D. et al., "Parsing English with a Link Grammar," CMU Technical Report, 1991, 93 pages.
Sleator, D. D. et al., "Parsing English with a Link Grammar," In Third International Workshop on Parsing Technologies, 1993, 14 pages.
Sleator, D., "Link Grammar License," 2005, printed from the internet at <http://www.link.cs.cmu.edu/link/license.html> on Feb. 21, 2012, 1 page.
Sleator, D., "Summary of Link Types," 1998, 7 pages.
Sneed, H. M., "Testing Against Natural Language Requirements," Seventh International Conference on Quality Software, IEEE Computer Society, 2007, 8 pages.
Soffer, P. et al., "Modelling Off-the-Shelf Information Systems Requirements: An Ontological Approach," Requirements Engineering, vol. 6, 2001, pp. 183-199.
"The Phrase Parser," printed from the internet at <http://www.abisource.com/projects/link-grammar/dict/ph-explanation.html> on Feb. 21, 2012, 8 pages.
"The Stanford Parser: A statistical parser," The Stanford Natural Language Processing Group, printed from the internet at <http://nlp.stanford.edu/software/lex-parser.shtml> on Feb. 21, 2012, 6 pages.

"WebSphere Industry Content Packs accelerate Insurance, Banking, Telecom, Healthcare & Industrial PLM WebSphere BPM solutions," IBM Software, printed from the internet at <http://www-142.ibm.com/software/products/gb/en/inducontpack/> on Feb. 21, 2012, 5 pages.

Zachos, K. et al., "Inventing Requirements from Software: An Empirical Investigation with Web Services," in 16th IEEE International Requirements Engineering Conference, IEEE Computer Society, 2008, pp. 145-154.

Zamin, N., "Information Extraction using Link Grammar," 2009 World Congress on Computer Science and Information Engineering, IEEE Computer Society, 2008, pp. 149-153.

* cited by examiner

FIG. 7

Open Capability Model Document | Generate Report

Visual View

☐ ☑ 03.07 Fulfill Orders (Order to Cash)
　☐ ☑ 03.07.01 Capture Customer Order
　　☐ 03.07.01.01 Carry Out Pricing
　　☐ 03.07.01.02 Check Availability and Transfer of Requirements
　　☐ 03.07.01.03 Determine Order Items
　　☒ 03.07.01.04 Open Order and Initiate Order Entry
　　☐ 03.07.01.05 Release Order Process
　　☒ 03.07.01.06 Check Customer Credit
　　☐ 03.07.01.07 Determine Business Partners
　☐ 03.07.02 Create and Analyze Sales Reports
　☐ 03.07.03 Create and Maintain Order Entry Tools
　☐ 03.07.04 Create and Process Deliveries
　☐ 03.07.05 Create Credit/Debit Memo Request
　☒ 03.07.06 Create Purchase Order
　☐ 03.07.08 Electronic Funds Transfer Process
　☐ 03.07.17 Pack Orders for Shipment
　☐ 03.07.18 Perform Dunning
　☐ 03.07.23 Process Credit and Debit Memos
　☐ 03.07.26 Process Customer Invoices and Payments Statistics
Selected Capability　　　　　　　Finance Function Summary
Total Children Capabilities　　　　24
Children Capabilities Associated with Reqs: 17

Open Req. Document

Visual View

☐ ☑ Order To Cash Requirements
　☐ ☑ Order Entry Requirements
　　☒ R01.01 The system shall allow the user to open order
　　☐ R01.02 The system shall allow the user to update existing order
　　☒ R01.03 The system shall allow the user to initiate order entry
　　☐ R01.04 The system shall allow the user to choose order type
　　☐ R01.05 The system shall allow the user to save inquiry order
　　☐ R01.06 The system shall allow the user to save quotation order
　☐ ☑ R02 Sales Analysis
　　☒ R02.01 The system shall allow the user to perform analysis and display sales information
　　☐ R02.02 The system shall allow the user to set settings interactively
　　☐ The system shall allow the user to save and retrieve reporting views
　☐ ☑ R03 Record Usage Requirements
　☐ ☑ R04 Create Credit and Debit Memo Req
　☐ ☑ R05 Create Purchase Order Req
　　☒ R05.01 The system shall allow the user to create purchase order
　☐ ☑ R06 Payment Information Entry Reqs
　　☒ R06.01 The system shall allow the user to enter payment information
　☒ The System shall provide support for Check Customer Credit ← 702

Statistics
Total Requirements:　　　32
Mapped Requirements:　　17
Unmapped Requirements:　15

SYSTEM FOR REQUIREMENT IDENTIFICATION AND ANALYSIS BASED ON CAPABILITY MODE STRUCTURE

CLAIM OF PRIORITY

This application claims priority to Indian provisional patent application no. 435/CHE/2010 filed on Feb. 19, 2010, the entirety of which is incorporated by reference herein.

TECHNICAL FIELD

This application relates to a system for language relationship identification, and more particularly, to a system configured to identify textual relationships based on verb and noun comparisons.

BACKGROUND

Organizations typically endeavor to become more efficient in operating regardless of the organization domain. Organizations typically implement various systems, such as software systems, in carrying out particular operations. Typically, these systems are initially designed based on documents describing operation of the systems. These documents may include lists of requirements that the organization desires in order to carry out the system as intended. However, the organization may seek to optimize the various systems based on preconfigured models describing operation of similar systems. However, the organization may have difficulty determining how the preconfigured models relate to the current system requirements of the organization due to language differences.

SUMMARY

According to one aspect of the disclosure, a textual analysis module may compare textual statements to determine if correspondence between the statements exists. In one example, the textual analysis system may determine correspondence between two statements based on the textual content of the statements. The determined correspondence may indicate that the two statements are similar in intent or meaning. The textual content may relate to verb-noun relationships in each of the statements. The textual analysis system may determine the correspondence based on a scoring system. The textual analysis system may analyze various aspects of the textual content of the statements, such as syntactical and semantical aspects. Based on this analysis, a score may be generated for each statement comparison. Based on the magnitude of the score, the textual analysis system may identify the statements as corresponding.

The textual analysis system may be applied to analyze desired organizational capabilities expressed as text statements with currently-implemented system requirements of an organization. Through the scoring system, the textual analysis system may indicate which system requirements of the organization correspond to the desired capabilities and which system requirements fail to have a corresponding capability. The textual analysis system may generate a requirement based on desired capability. The generated requirement may be stored for subsequent use.

According to another aspect of the disclosure, the textual analysis system may generate a visual representation of determined correspondence between statements. The textual analysis system may retrieve multiple documents and each document may contain a number of statements. The textual analysis system may generate a visual presentation for display that lists the various statements and correspondence between the statements with respect to separate documents. The visual presentation may be implemented to identify correspondence between desired organizational capabilities and current system requirements. The visual presentation may allow identification of redundant or superfluous requirements or may allow recognition of requirements that may require generation to incorporate one or more particular capabilities.

According to another aspect of the disclosure, the textual analysis system may determine interrelationships between organizational capabilities. The textual analysis system may identify organizational capabilities and processes associated with realization of one or more particular organizational capabilities. The textual analysis system may identify the organizational capabilities and processes not having corresponding system requirements when the particular organizational capabilities have corresponding system requirements.

According to another aspect of the disclosure, the textual analysis system may identify sub-systems associated with general systems described expressed as organizational capabilities. The textual analysis may identify corresponding system requirements associated with the sub-systems and may update the system requirements to describe the sub-systems.

Further objects and advantages of the present invention will be apparent from the following description, reference being made to the accompanying drawings wherein the preferred embodiments of the present invention are clearly shown.

BRIEF DESCRIPTION OF THE DRAWINGS

The innovation may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

FIG. 7 is another example of a visual representation generated by the textual analysis module of FIG. 1.

DETAILED DESCRIPTION

Organizations are typically structured to accomplish various tasks in order to operate in a desired manner. Organizations of various domains, such as banking, ecommerce, telecommunications, etc., may have domain-specific manners of accomplishing these tasks. Organizations may require structuring and organization of these tasks in a particular manner in order to carry out the tasks. For example, a banking institution may have a particular routine or process for carrying out a task such as handling an electronic deposit from a customer. When developing the particular routine or process for accomplishing a particular task, an organization may implement a set of requirements to be met. A requirement may be some active or passive event associated with a system of an organization that the organization may desire to occur in order to complete a related task. Requirements may be embodied by requirement statements. Each requirement statement may be a textual statement describing a desired aspect of the associated system. Various applications, such as software applications, may be designed through requirements statements. The textual form of requirement statements may be restricted by particular format for purposes of conformity.

Organizations may desire to make internal routines and processes more efficient by comparing the internal routines and processes to predetermined capability models. A capability model (or process model) may be defined as a model containing one or more capabilities and/or processes for carrying out one or more particular aspects having a commonality. Each capability may define some ability having the capacity for improvement. An established organization may use a particular capability model as a standard of comparison to its own internal routines and processes in order to more closely resemble the particular capability model. An organization may use requirement statements embodying the routines and processes to perform such a comparison.

Figure 1:
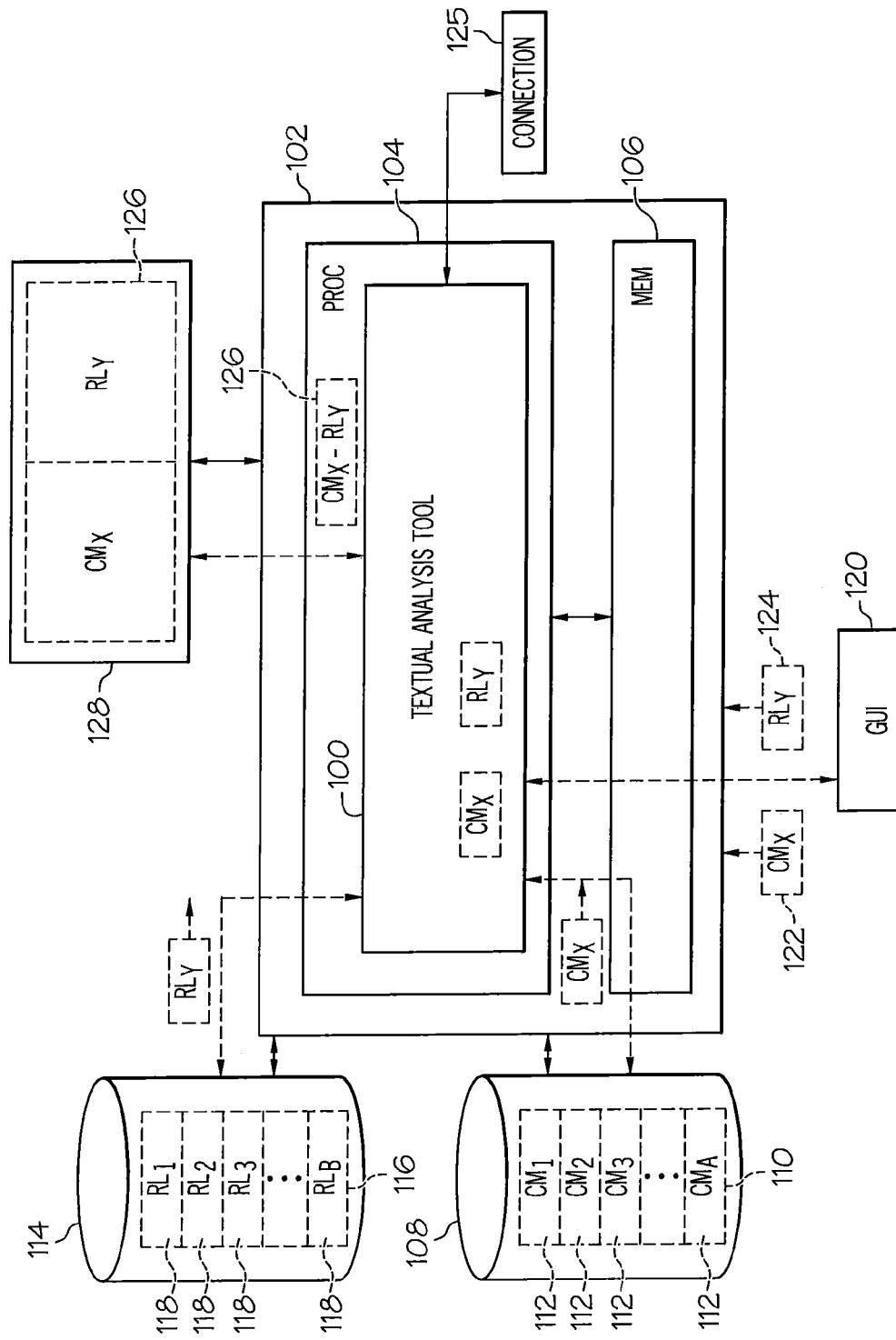
FIG. 1 is a block diagram of an example textual analysis module executable on a computer device.

FIG. 1 is a block diagram of a textual analysis system ("TAS") 100. In FIG. 1, the TAS 100 may be executed on a computer device 102. In one example, the TAS 100 may include one or more modules executable by a processor 104 of the computer device 102. The TAS 100 may be one or more software modules that may be stored on a memory device such as memory 106 of the computer device 102. As described herein, the modules are defined to include software, hardware or some combination thereof executable by the processor 104. Software modules may include instructions stored in the memory 106, or other memory device, that are executable by the processor 104 or other processors. Hardware modules may include various devices, components, circuits, gates, circuit boards, and the like that are executable, directed, and/or controlled for performance by the processor 104. The memory 106 may include one or more memories and may be computer-readable storage media or memories, such as a cache, buffer, RAM, removable media, hard drive or other computer readable storage media. Computer readable storage media may include various types of volatile and nonvolatile storage media. Various processing techniques may be implemented by the processor 104 such as multiprocessing, multitasking, parallel processing and the like, for example. The processor 104 may include one or more processors.

In one example, the TAS 100 may have access to one or more databases storing information relating to requirement lists and capability models. In one example, a database 108 may store a capability model data set 110. The capability model data set 110 may include a plurality of capability models 112 individually designated as $CM_X$, where "X" is the index of a particular capability model $CM_1$ through $CM_A$, where "A" is number of capability models. Each capability model 112 may include one or more capabilities. In one example, each capability model 112 may be one or more electronic documents describing various aspects of the capability model. Each capability may be expressed as a textual statement in an electronic document.

A database 114 may store a requirements data set 116. The requirements data set 116 may include a plurality of requirement lists 118. Each requirement list 118 is individually designated as $RL_Y$, where "Y" is the index of a particular requirement list 118 $RL_1$ through $RL_B$, where "B" is the number of requirement lists 118. Each requirement list 118 may include one or more requirements ("R"). In one example, each requirement list 118 may be one or more electronic documents describing various aspects of a system. Each requirement in the requirement list 118 may be expressed as a textual statement in an electronic document.

During operation, the TAS 100 may automatically map a particular capability model to a particular requirement list. Mapping the particular capability model 112 to the particular requirement list 118 may indicate capabilities of the particular capability model 112 that have one or more corresponding requirements of the particular requirement list 118. Thus, the mapping may identify requirements in the requirement list 118 that may address the corresponding capabilities in the capability model 112. The TAS 100 may receive input(s) related to particular capability model 112 and the particular requirement list 118. For example, the TAS 100 may receive user input(s) via a graphical user interface (GUI) 120. The GUI 120 may include various devices such as a display, keyboard(s), mouse, microphone, and any other suitable device allowing a user interaction with the TAS 100. The GUI 120 may be remotely connected with the TAS 100, such as over an Internet connection, Virtual Private Network, direct network, or other suitable networking implementation. In other examples, the GUI 120 may be directly connected to the computer device 102 such as in a personal computer configuration. The TAS 100 may receive an input 122 from the GUI 120. The input 122 may include a user-based selection of a capability model $CM_X$ from the capability model data set 110. Upon receipt of the input 122, the TAS 100 may retrieve the capability model CMx from the capability model data set 110. Similarly, the TAS 100 may receive an input 124 that includes a user-based selection of a requirement list $RL_Y$. Upon receipt of the input 124, the TAS 100 may retrieve the requirement list $RL_Y$ from the requirement list data set 116.

Upon receipt of the capability model $CM_X$ and the requirement list RSy, the TAS 100 may map each capability of the capability model $CM_X$ to one or more corresponding requirements in the requirements list $RS_Y$ based on a comparison (FIG. 3) of one or more textual statements expressing each respective capability and requirement. Correspondence may be considered to exist when the textual content of a requirement includes one or more similar aspects with respect to the textual content of a capability. Thus, the correspondence between a capability and a requirement may indicate that the requirement describes a similar aspect as that of the capability.

In one example, the TAS 100 may implement source material stored in the memory 106 or accessed through a connection 125 to support a capability-requirement comparison. The connection 125 may be a link to directly or indirectly-connected resources, or may be network connection, or Internet connection allowing online sources to be accessed. The TAS 100 may, upon completion of the mapping, generate a visual representation 126 of the mapping. The visual representation 126 may be transmitted to one or more displays such as display 128. The display 128 may be part of the GUI 120 or may be independent.

Figure 2:
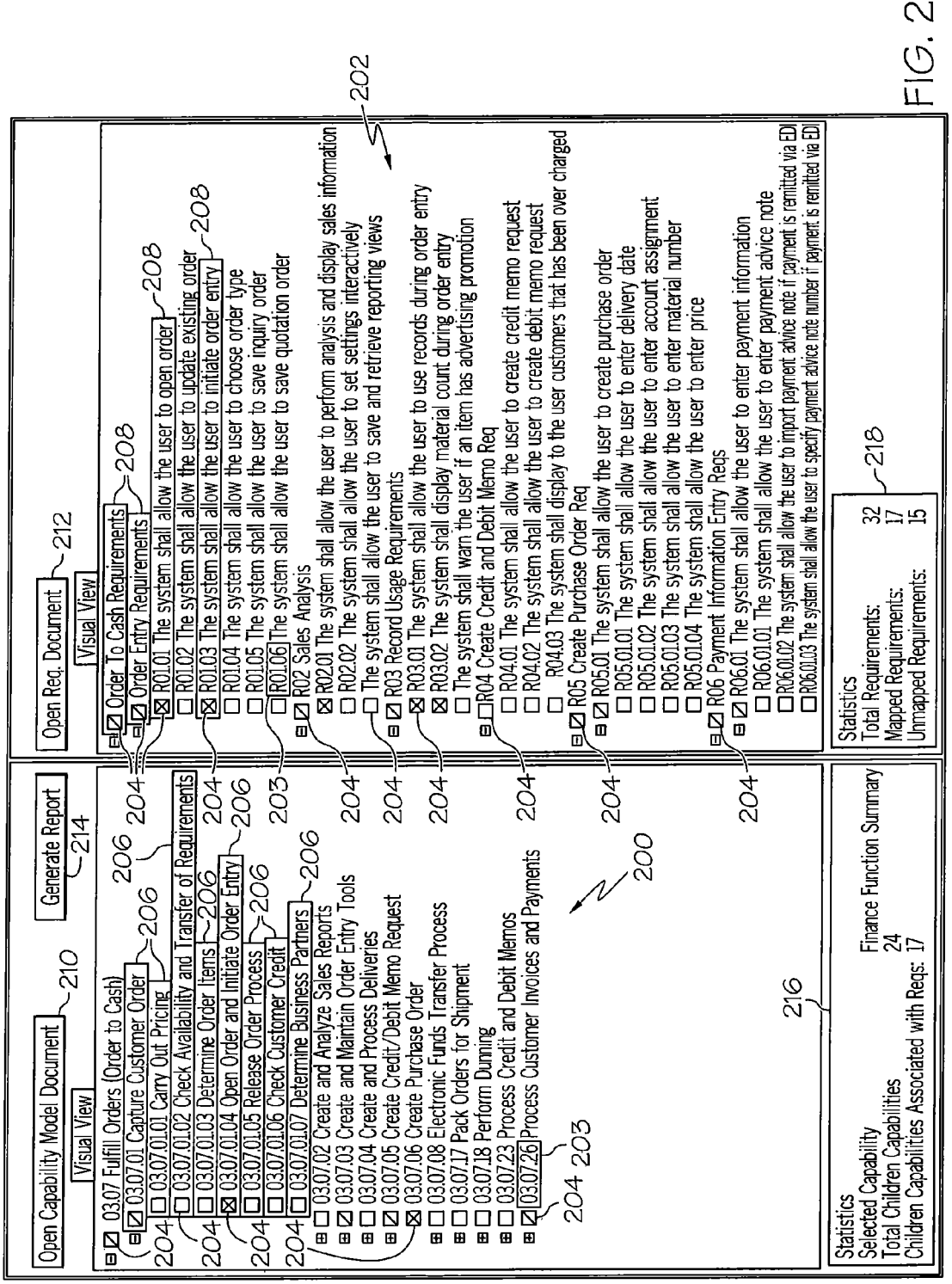
FIG. 2 is an example of a visual representation generated by the textual analysis module of FIG. 1.

FIG. 2 is an example of the visual representation 126 generated on the display 128. The visual representation 126 may be interactive allowing an input received from the GUI 120 to be implemented to edit the visual representation 126. In FIG. 2, the selected capability model 110 relates to an organization domain of e-commerce. In particular, the capability model 110 relates to fulfilling orders in e-commerce. The visual representation 126 may include a capability listing 200 of a number of capabilities and a requirement listing 202 of a number of requirements. The capabilities and requirements listed may be hierarchical in nature. In other words, a particular capability may be a "parent" capability of several "child" capabilities. Similarly, each requirement may include several child requirements, may be a child requirement, or both. Each capability and requirement listed may include an index 203 to indicate the hierarchical association. The index 203 may also indicate the organization of each capability model 112 within a group of capability models 112.

The visual representation 126 may allow interaction for expanding a capability to show the child capabilities or for collapsing child capabilities such that they are hidden. In the example of FIG. 2, a plus sign ("+") next to a capability or requirement indicates that the particular capability or requirement may be expanded to visually show children capabilities and children requirements, respectively. A minus sign ("−") indicates that the particular capability or requirement may be collapsed to visually hide respective children capabilities and children requirements.

In FIG. 2, a correspondence level indicator 204 may be generated next to each capability and requirement in the respective listings 200, 202. The correspondence level indicator 204 may indicate a level of correspondence between capabilities and requirements. In one example, the correspondence level indicator 204 may include a box that may be empty, include a slash, or include an "x." An empty box next to a capability may indicate there is no correspondence to a requirement in the requirement listing 202. Similarly, an empty box next to a requirement may indicate there is no correspondence to a capability in the capability listing 200. A slash ("/") may indicate some level less than complete correspondence and an "x" indicates complete or direct correspondence.

For example, in FIG. 2, the capability "Create Purchase Order" includes an "x" in the respective correspondence level indicator 204. This capability does not have any child capabilities and has at least one corresponding requirement. Thus, the capability has full correspondence to the requirement list. The capability "Capture Customer Order" has a slash "/" as a correspondence level indicator 204. The sub-capability "Open Order and Initiate Order Entry" has an "x" meaning that it has at least one corresponding requirement and, without any child capabilities to consider, has complete correspondence. Thus, since "Open Order and Initiate Order Entry" is a child capability of the capability "Capture Customer Order" but other child capabilities of "Capture Customer Order" do not have corresponding requirements, the capability "Capture Customer Order" has some, but not complete, correspondence.

Thus, the visual representation 126 indicates two-way correspondence of capabilities and requirements. The two-way correspondence allows a selection of either a particular capability of the listing 200 or a particular requirement of the listing 202 in order to identify the corresponding capabilities or requirements. For example, in FIG. 2, the capability "Capture Customer Order" has been selected as indicated by capability selection indicator 206. The capability selection indicator 206 may be a box surrounding the selected capability. Selection of a capability or requirement may be performed through user interaction via the GUI 120, such as through a point-and-click mouse interface. In one example, selection of a capability may also automatically select any visible children capabilities, such as that shown in FIG. 2.

Upon selection of the capability, the corresponding requirements may be selected automatically or through further input. Selection of the requirements is indicated by requirement selection indicators 208. In FIG. 2, the requirement selection indicators 208 are each a single box outlining the selected requirement. As shown in FIG. 2, selection of the capability "Capture Customer Order" allows selection of several requirements in the requirements listing 202. Two requirements having direct correspondence are both child capabilities of a requirement "Order Entry Requirements." "Order Entry Requirements" is a child capability of "Order To Cash Requirements." Both of these parent capabilities will have some level of correspondence as indicated by the slash "/." Selection of a particular requirement allows similar indication of corresponding capabilities in the capability listing 200. In alternative embodiments, various correspondence level indicators and selection indicators may be implemented.

The visual representation 126 may allow different capability models 112 to be loaded while the visual representation 126 is being displayed. The "Open Capability Model Document" 210 selector may be selected and one or more capability model data sets may be browsed for selection of a particular capability model 112. Similarly, the "Open Requirement Document" selector 212 may be selected and one or more requirement list data sets may be browsed for selection of a particular requirements listing. The "Generate Report" selector 214 may be selected to direct the TAS 100 to generate the mapping between a selected capability model 112 and a selected requirement list 118. The visual representation 126 may also include statistical information. In FIG. 2, capability statistical information 216 may be displayed below the capability listing 200 and requirement statistical information 218 may be displayed below the requirement listing 202. The statistical information 216 may provide information relating to the number of capabilities and requirements and number of corresponding capabilities and requirements, for example.

The layout of the visual representation 126 as shown in FIG. 2 is illustrative in nature. Various layouts may be used other than the side-by-side arrangement shown in FIG. 2. For example, the visual representation 126 may be configured to provide a "drill-down arrangement" such that the visual representation allows one or more particular hierarchical level to be displayed at one time allowing movement between the levels. Such alternative layouts may be offered simultaneously with that shown in FIG. 2 allowing toggling between the layouts during use.

Figure 3:
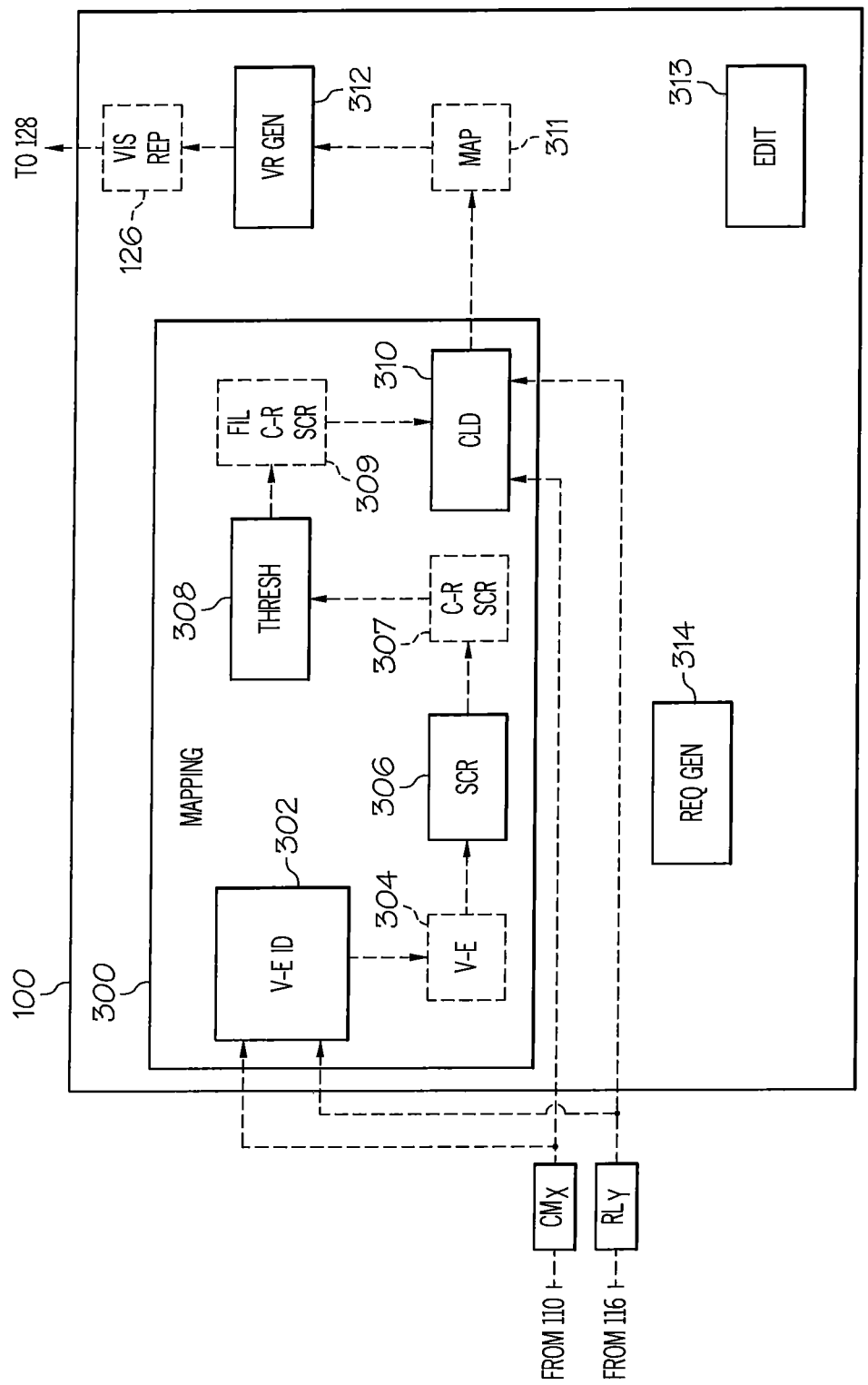
FIG. 3 is another block diagram of the textual analysis module of FIG. 1

FIG. 3 is detailed block diagram of one example of the TAS 100. The TAS 100 may include a mapping module 300 configured to determine correspondence between a selected capability model 110 and a requirements list 116. In one example, the TAS 100 may retrieve a desired capability model data set $CM_X$ and requirements list data set $RL_Y$ as described with regard to FIG. 1. The TAS 100 may use a scoring system based on comparison of textual content of each capability in the capability model $CM_X$ and each requirement in the requirement list $RL_Y$. In one example, the TAS 100 may compare each unique pair of a capability from the capability model $CM_X$ data set and a requirement R from the requirement list data set $RL_Y$.

The mapping module 300 may include a verb-entity identification module 302. The verb-entity identification ("V-E ID") module 302 may be configured to identify one or more verb-entity pairs in each capability of the capability model data set $CM_X$ and in each requirement of the requirement list data set $RL_Y$. Verb-entity pairs may refer to a verb-noun relationship in a textual statement, and the noun may be considered an entity for purposes of interacting within a system. The entity may be a system user or the system itself, for example. In one example, the verb-entity identification module 302 may use a natural language processing tool. Open source tools, such as a natural language processing tool, may be implemented by the TAS 100, such as OpenNLP, for example. The TAS 100 may access open source tools via the connection 125.

The verb-entity identification module 302 may generate verb-entity ("V-E") data set 304 including each of the identified verb-entity pairs for each capability of the capability module data set $CM_X$ and each requirement of the requirement list data set $RL_Y$. A scoring ("SCR") module 306 may receive the verb-entity data set 304. The scoring module 306 may calculate a score based on a comparison, of each verb-entity pairs for each unique capability-requirement pair. In other examples, the scoring module 306 may calculate score for each unique capability-requirement pair meeting predetermined criteria. In one example, the match score for a verb-entity comparison for each unique capability-requirement pair may be determined by:

$$\text{Match}(R,C) = \max(VEP\text{SynMatch}(R,C), Sem VEP\text{Match}(R,C), WM(R,C)) \quad \text{(Eqn. 1)}$$

where the Match(R,C) function may generate a match score of a verb-entity comparison for a capability-requirement pair. Eqn. 1 indicates that the maximum of three different scores may be used for Match(R,C). The function VEPMatch(R,C) may be defined by Eqn. 2 as:

$$VEP\text{Match}(R,C) = \max(\text{Syn}VEP\text{Match}(R,C), Sem VEP\text{Match}(R,C)) \quad \text{(Eqn. 2)}$$

where, as described later, SynVEPMatch(R,C) is a function that may generate a score based on a syntactic match using string matching techniques as well as word stemming techniques. String matching techniques may refer to matching character strings to determine similarity between the strings. SemVEPMatch(R,C) is a function that may generate a score based on a semantic match using synonym matching and semantic relationship matching, as described later. In one example, SynVEPMatch(R,C) may be defined as:

$$\text{Syn}VEP\text{Match}(R,C) = \text{stringCompare}(\text{stem}(V_R), \text{stem}(V_c)) * \text{stringCompare}(\text{stem}(E_R), \text{stem}(E_c)) \quad \text{(Eqn. 3)}$$

where:
$V_R$=the verb of the requirement;
$V_C$=verb of the capability;
$E_R$=entity of the requirement; and
$E_C$=entity of the capability.

The function "stem(w)" may generate the stem of the word (verb, entity, or other word type) identified through a particular stemming technique, such as the Porter Stemming Algorithm. For example, a stemming technique may determine that the word "connected" has a stem of "connect." This is useful to determine that "connect" and "connected" are a match. The "stringCompare" function of Eqn. 3 may be defined as:

$$\text{stringCompare}(w1, w2) = \begin{cases} 1 & \text{if } w1 = w2, \\ 0 & \text{Otherwise.} \end{cases} \quad \text{(Eqn. 4)}$$

Thus, SynVEPMatch(R,C) function may generate either one ("1") or zero ("0"). For example a comparison of the terms "report" and "profit report" would return a score of one ("1") since the stem of "profit report" may be considered to be "report." In other examples, other scoring scales may be implemented, such as a sliding scale.

Turning now to SemVEPMatch(R,C), the function may be defined as:

$$Sem VEP\text{Match}(R,C) = \frac{\max(\text{lex}(V_R, V_C), \text{ont}(V_R, V_C))^*}{\max(\text{lex}(E_R, E_C), \text{ont}(E_R, E_C))} \quad \text{(Eqn. 5)}$$

where the "lex" function is defined by:

$$\text{lex}(w1, w2) = \begin{cases} 0.9 & \text{if } w1 \text{ is a synonym of } w2 \text{ in } Wordnet, \\ 0.8 & \text{if } \exists w, \text{S.T. } w \text{ is a synonym of} \\ & w1 \text{ and } w \text{ is a synonym of } w2 \text{ in } Wordnet, \\ 0 & \text{Otherwise} \end{cases} \quad \text{(Eqn. 6)}$$

To determine if the verbs or entities are synonyms, the TAS 100 may implement various sources such as internally stored lexicons, or may connect to remote sites, such as through the Internet. In one example, online services such as Wordnet may be utilized by the mapping module through the connection 125. Based on the utilized source, the synonym match may be scored according to Eqn. 6. In other examples, other scoring systems may be used. The difference between the 0.9 and 0.8 scoring may be illustrated through an example. Wordnet may identify synonyms of "create" as "make" and "produce" and identify synonyms of "develop" as "evolve," "generate," and "produce." Thus, a comparison of the verb pair (create, produce) may generate a score of 0.9 according to Eqn. 6 since "produce" is a direct synonym of "create." However, a comparison of the verb pair (create, develop) would generate a score of 0.8 according to Eqn. 6 since create and develop are not direct synonyms, but do share at least one common synonym, "produce."

The "ont" function may generate a score based on a semantic matching between verb-entity pairs. Such semantic matching may be implemented using any form of tool used to match meanings of terms such as: 1) ontologies; 2) an open source reasoning engine; and/or 3) semantic web querying language. Ontologies may be considered as a representation of the meaning of terms in vocabularies and the relationships between those terms. Ontologies may be used to present language, word, and term meanings and relationships to computer applications. Open source reasoning engines, such as Jena, for example, may provide rule-based inferences between words to provide a basis for semantical comparisons.

In one example, ontologies using any available knowledge-based or document repository sources such as OWL open source intranet knowledge base can be used to explicitly represent the meaning of terms in vocabularies and the relationships between those terms. This representation of terms and their interrelationships is called an ontology.

In one example, the "ont" function may be defined as $$ont(w1, w2) = \begin{cases} 1 & \text{if } OWL\text{: sameAs}(w1, w2), \\ 0.75 & \text{if } OWL\text{: subClassOf}(w1, w2), \\ 0.5 & \text{if } OWL\text{: subclassOf}(w2, w1), \\ 0 & \text{Otherwise.} \end{cases} \quad \text{(Eqn. 7)}$$

Eqn. 7 may indicate a level of semantical matching between terms "w1" and "w2." In other examples, other scoring ranges or mechanisms may be implemented to perform the semantical matching.

The "WM(R,C)" function of Eqn. 1 may be defined by:

$$\text{WordMatch}(R,C) = \max(0.7, \Sigma \text{argmax}_{i,j} \text{related}(wR_i, wC_j)) \quad \text{(Eqn. 8)}$$

where:
$wR_i$=a set of entities and verbs extracted from a requirement R;
$wC_j$ is a set of entities and verbs extracted from a capability C;
argmax is a function to determine the maximum point for each set of "related($wR_i$, $wC_i$)" and where:

$$related(w1, w2) = \begin{cases} 0.2 & \text{if stringCompare}(w1, w2) > 1, \\ 0.1 & \text{if } lex(w1, w2) > 0.7, \\ 0.1 & \text{if } ont(w1, w2) > 0.5, \\ 0 & \text{Otherwise.} \end{cases} \quad \text{(Eqn. 9)}$$

The WM(R,C) function may be utilized when the other scoring functions of MatchScore(R,C) fail to identify a match based on Eqns. 2-7 between verb-entity pairs. Thus, each verb-entity pair for each unique capability-requirement pair may be given a match score generated by the scoring module 306. A score may be generated for a single capability as compared to each single requirement. The scoring module 306 may provide a scored capability-requirement pair ("C-R SCR") data set 307 to a threshold detector ("THRESH") module 308. The threshold detector 308 may filter the scored capability-requirement pair data set 307 based on a predetermined scoring threshold, such as 0.7 for example. If a match score (MatchScore(R,C)) is greater than the predetermined threshold, the capability-requirement pair may be considered to be a match and a filtered capability-requirement pair score ("FIL C-R SCR") data set 309 may be transmitted by the threshold detector 308 to a correspondence level determination module ("CLD") 310. The correspondence level determination module 310 may receive the capability list $CM_X$ and the requirement list $RL_Y$, and along with the filtered capability-requirement pair scored data set 310, determine the correspondence levels based on the hierarchical intra-relationships between capabilities and requirements. The determinations performed by the correspondence level determination module 310 may be used to generate the correspondence level indicators 204. The correspondence level determination module 309 may generate a mapping ("MAP") data set 311 to be received by a visual representation generator 312. The mapping data set 311 may include the determined correspondence between each capability and requirement. The visual representation generator 312 may generate the visual representation 126 as described with regard to FIG. 1 using the mapping data set 311 to generate visual indication of capability-requirement correspondence where appropriate.

Figure 4:
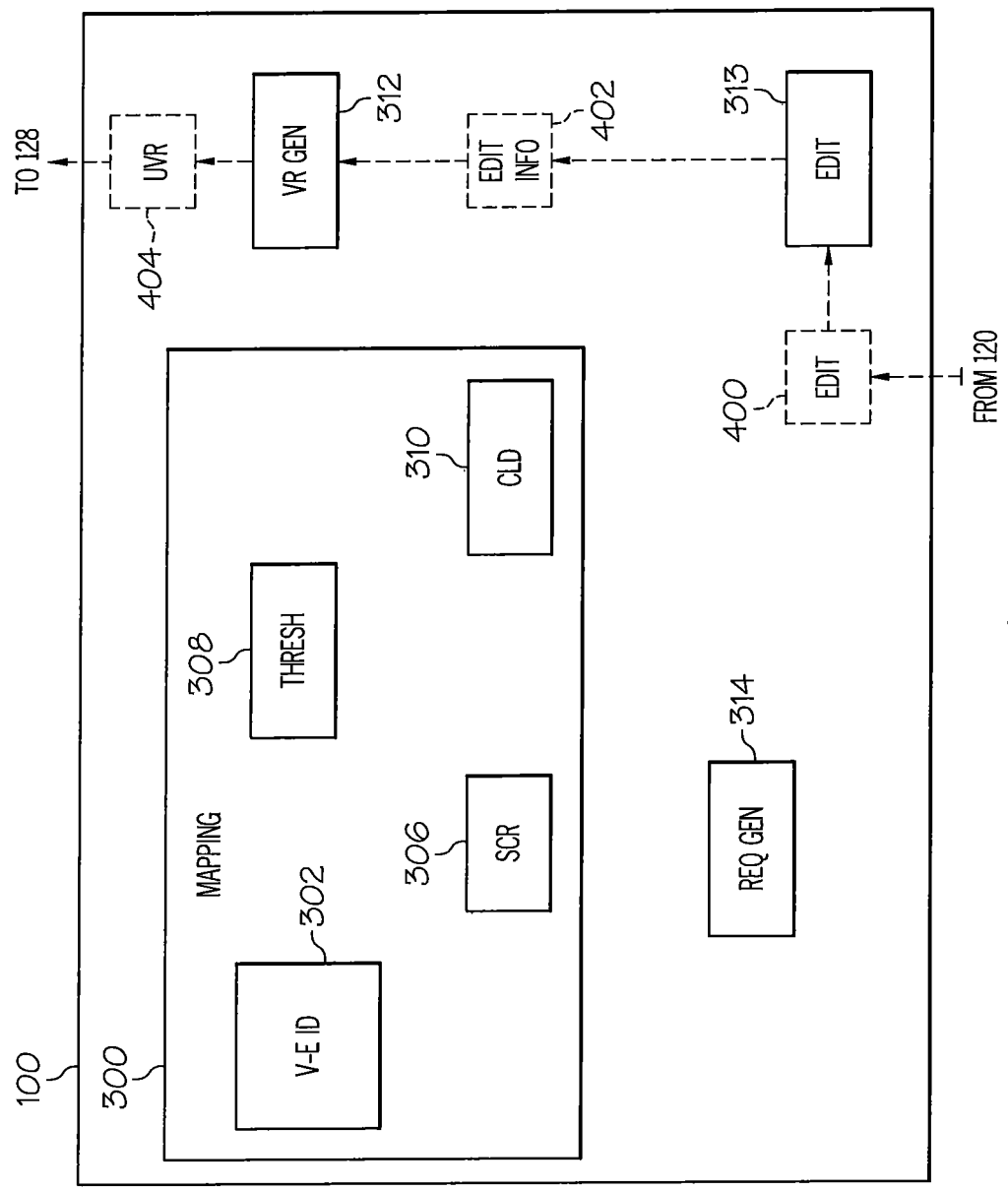
FIG. 4 is another block diagram of the textual analysis module of FIG. 1.

Upon completion of the mapping performed by the TAS 100, the visual representation 126 may be edited for various reasons. In one example, the mapping performed by the TAS 100 may indicate that multiple requirements correspond to the same capability. Such instances may indicate that some requirements may be eliminated due to redundancy if one or more other requirements can cover a particular capability. In such instances, as shown in FIG. 4, the TAS 100 may include an edit module 313 to receive a user-based input 400 to edit the visual representation 126. In other examples, the input 400 may be automatically generated based on predetermined criteria. The input 400 may include a requirement $R_Z$ to be eliminated from the requirements listing. The input 400 may be received by the edit module 313 from the GUI 120 or other connected interface. The edit module 313 may process the input 400 and generate an edit information ("EDIT INFO") data set 402. The edit information data set 402 may be transmitted by the edit module 313 to the display 128. The visual representation generator 312 may receive the edit information data set 402 and generate an updated visual presentation ("UVR") 404 to transmit to the display 128. In one example, the edit module 313 may prompt a user to indicate permanency of the edit. For example, the requirement(s) for removal may be permanently removed from the requirements list data set 116 or may be stored separately.

The operation of TAS 100 may be applied to various textual data to identify textual relationships. For example, two lists of textual statements may be compared using the TAS 100 and the TAS 100 may identify textual content relationships between the two lists such as in the manner described. The visual representation 126 may indicate that textual statements compared between the two lists contain similar content to the extent that each textual statement may each contain at least one verb-entity pair as previously described. In other examples, the TAS 100 may determine other types of textual relationships.

Figure 5:
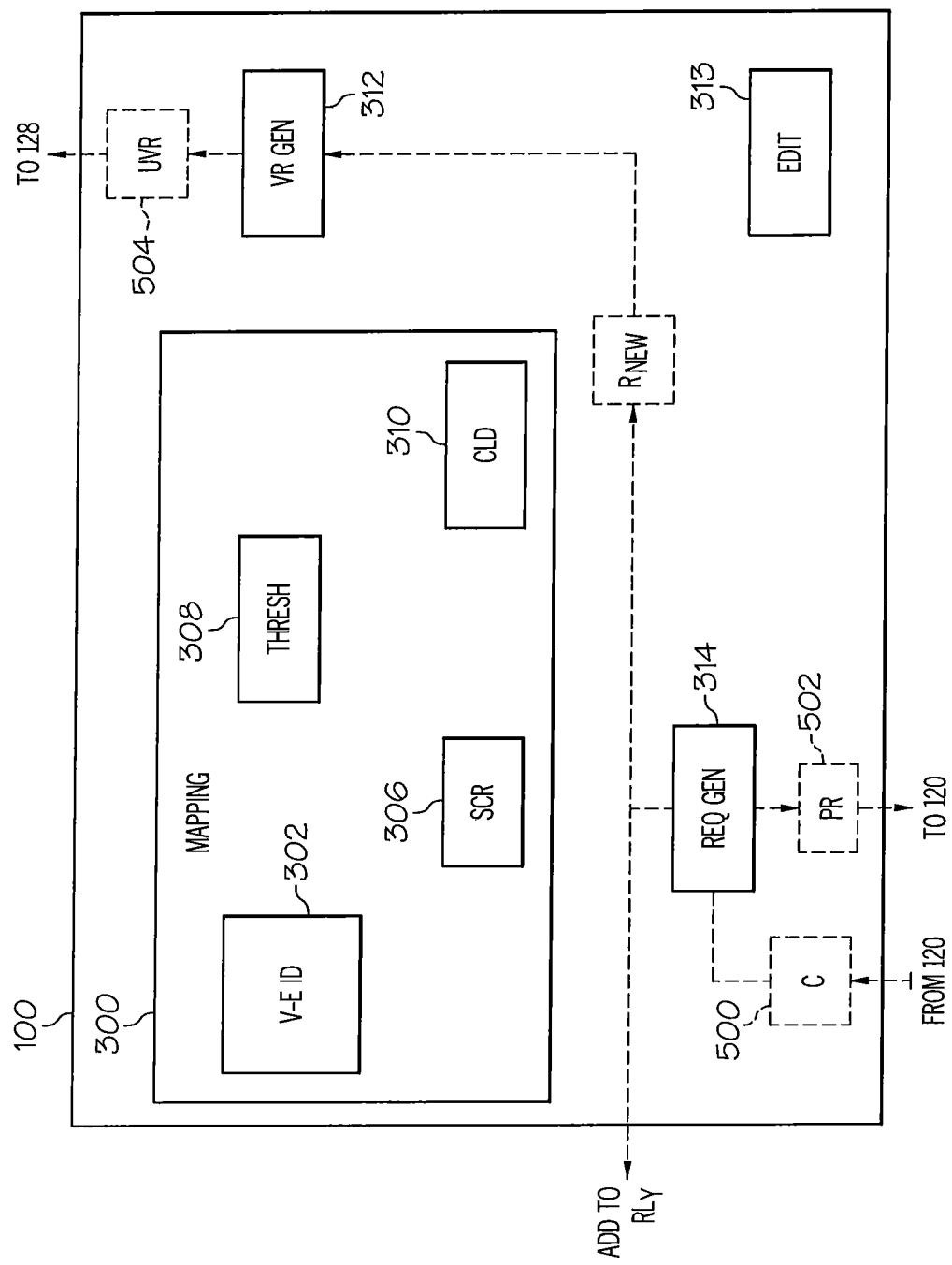
FIG. 5 is another block diagram of the textual analysis module of FIG. 1.
Figure 6:
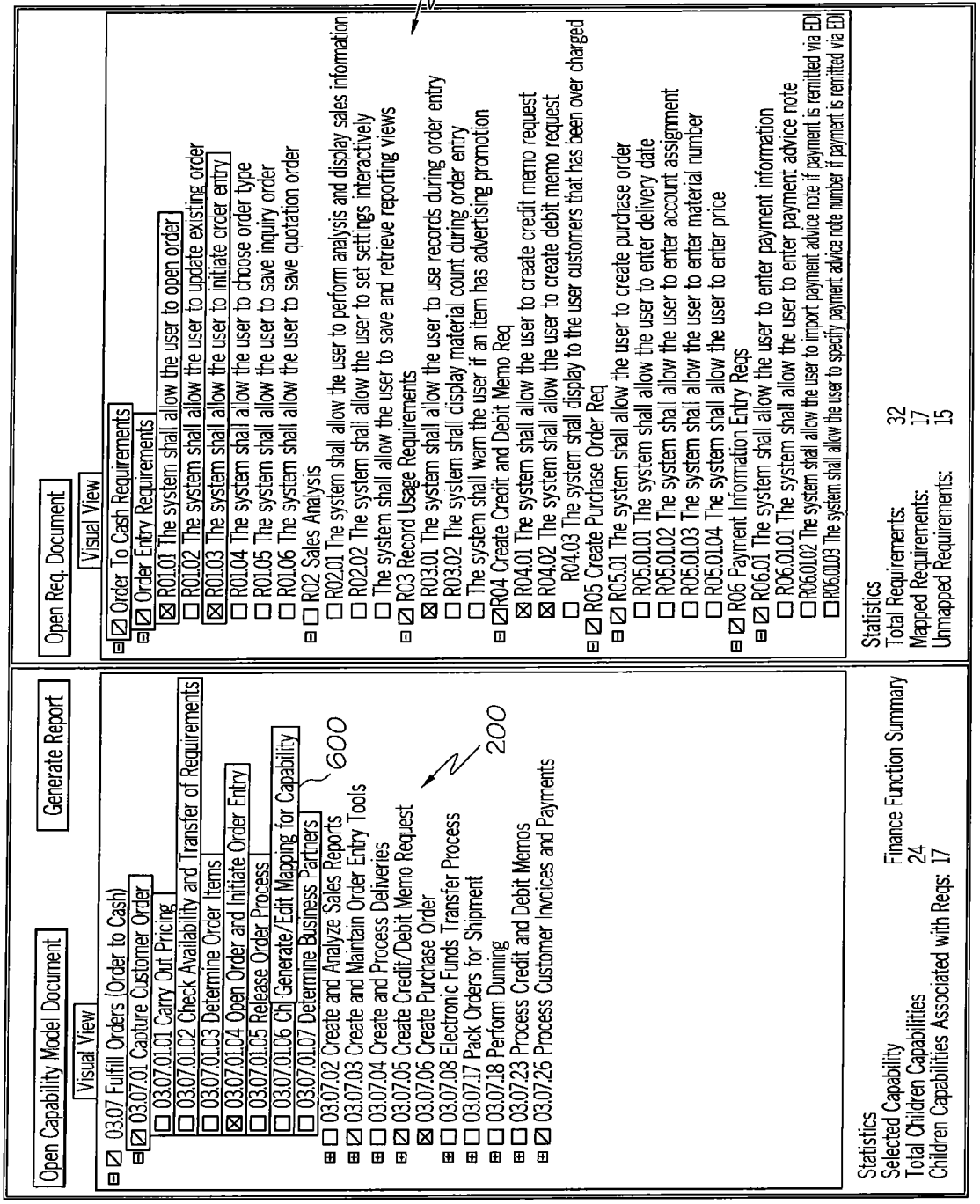
FIG. 6 is another example of a visual representation generated by the textual analysis module of FIG. 1.

The TAS 100 may also include a requirements generator ("REQ GEN") module 314. The requirements generator module 314 may generate a requirement to be included in a particular requirement list $RL_Y$ based on a capability from a particular capability model $CM_X$. For example, the visual presentation 126 may indicate that a particular capability in the capability listing 200 has no corresponding requirement. The requirements generator module 314 may receive a user-based input indicative of selection of a particular capability. As shown in FIG. 5, the requirement generator module 314 may receive an input 500 including a capability selection of the currently-displayed capability model $CM_X$ indicating a selected capability "C" from the capability listing 200. FIG. 6 shows a capability selected from the capability listing 200 from FIG. 2. In FIG. 6, selection of a particular capability generates a selection indicator 600 requesting input to determine a requirement is to be generated.

If the requirement is to be generated, the requirement generator module 314 may extract a verb-entity pair from the selected capability in a manner such as that described with regard to FIG. 3. The requirement generator module 314 may generate a requirement including the extracted verb-entity pair. In another example, the requirement generator 314 may add a selected prefix to the selected capability. The requirements generator module 314 may generate a prefix request ("PR") 502 to prompt a user to determine a preferred prefix for the requirement. In one example, a requirement prefix option may be "the system shall provide support for" or "the system shall allow the user to" depending on how the requirement should be handled. In alternative examples, the prefix choices may be expanded to include other desired aspects of a system covered by the requirement listing 202. Other examples may include automatic generation of requirements by the requirement generation module 314 corresponding to capabilities not initially having corresponding requirements. Other examples may also include a user-created requirement.

Upon receiving the desired prefix, the requirement generator module 502 may generate a new requirement $R_{NEW}$. The new requirement $R_{NEW}$ may be transmitted to the visual representation generator 312. The visual representation generator 312 may generate an updated visual representation ("UVR") 504 and transmit it to the display 128 for display. The requirement generator 314 also may update the requirement list 118 with the new requirement $R_{NEW}$.

In the example of FIG. 6, the capability of "Check Customer Credit" is chosen for requirement generation. Upon execution, the requirement generator 314 may generate the prefix request 502. Upon receiving a reply to the prefix request, the requirement generator 314 may generate the requirement "The system shall provide support for Check Customer Credit." The requirement may be placed at the bottom of the requirement listing 202. In other examples, the requirement may be automatically positioned in a different location than that shown in FIG. 7. The requirement may also be positioned by a user in a desired location within the requirement listing 202. FIG. 7 shows the updated requirement listing 202 with the newly created requirement 702.

Figure 8:
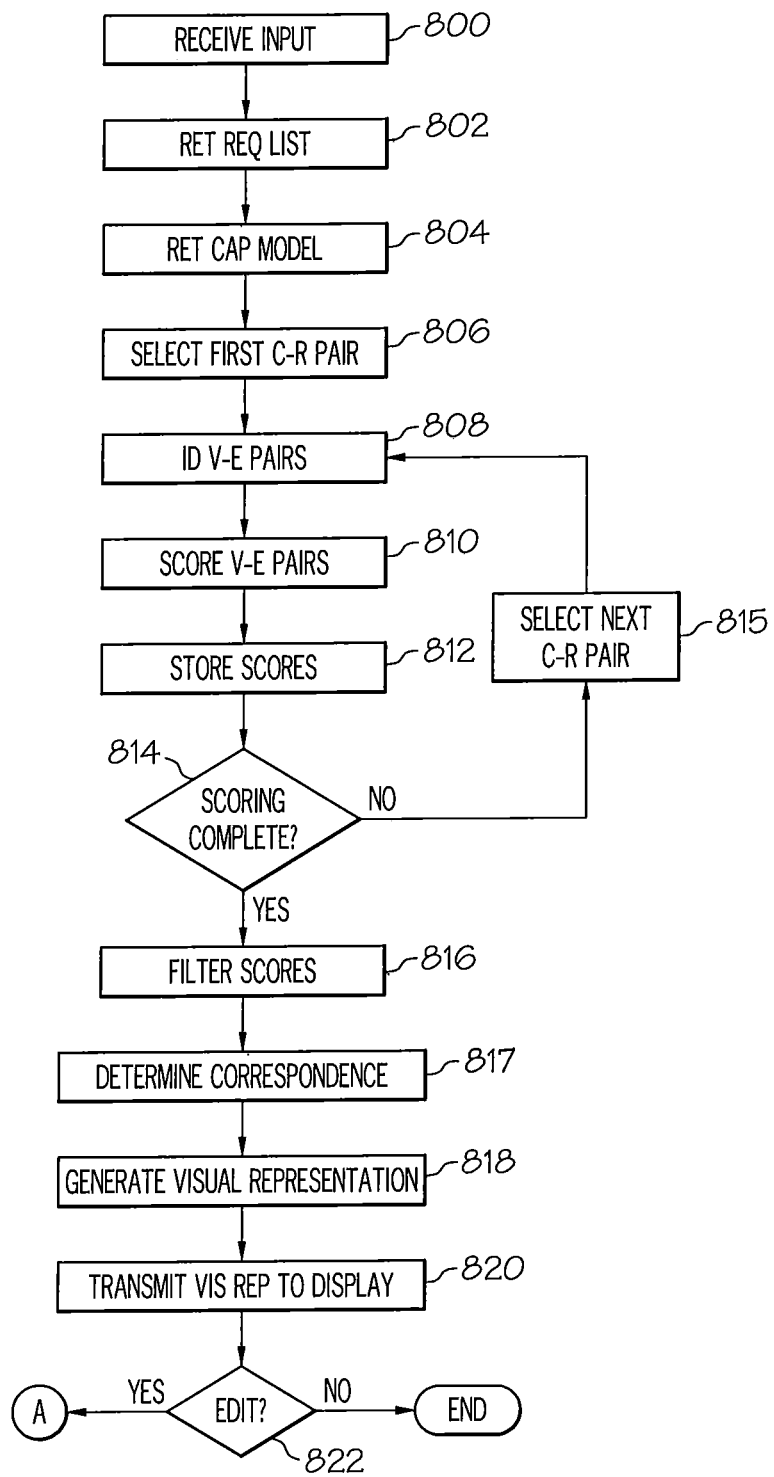
FIG. 8 is an example operational flow diagram for implementing the textual analysis module of FIG. 1.
Figure 9:
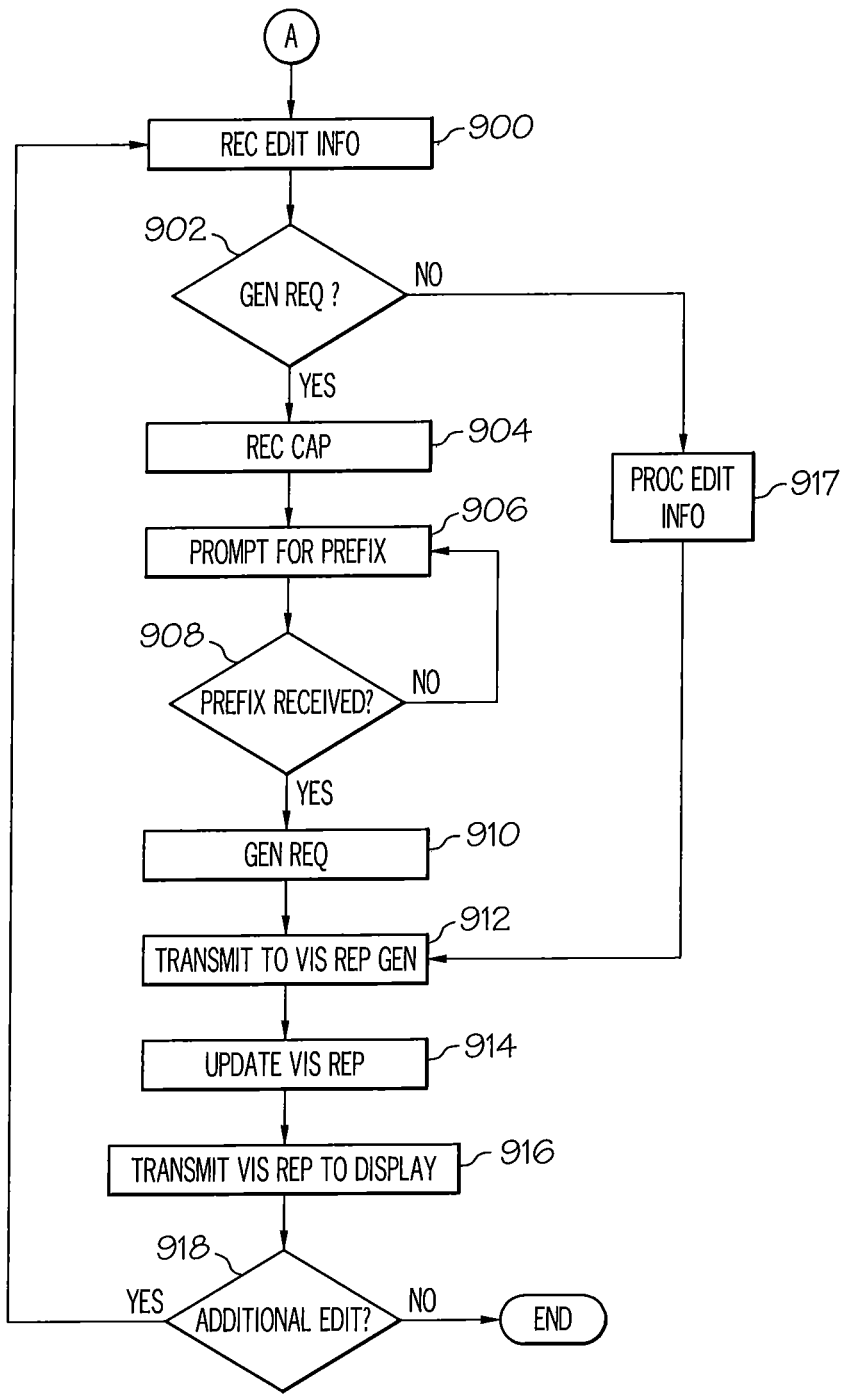
FIG. 9 is an example operational flow diagram for implementing the textual analysis module of FIG. 1.

FIGS. 8 and 9 show an example operational flow diagram for the TAS 100. The TAS 100 may receive input from the GUI 120 or other connected input device (block 800). The input may be representative of one or more desired capability models 112 and one or more desired requirement lists 118. The TAS 100 may retrieve the requirement list $RL_Y$ from the requirement list 118 (block 802). The TAS 100 may retrieve the capability model $CM_X$ data set (block 804). The TAS 100 may select a first capability-requirement pair, or statement pair, using the verb-entity identification module 302 (block 806) including a single capability and a single requirement. The verb-entity identification module 302 may identify verb-entity pairs within the first capability-requirement pair (block 808). The scoring module 306 may generate a score based on a level of similarity verb-entity pair for the first capability-requirement pair (block 810). The scoring may be performed in a manner described with regard to FIG. 3. The generated scores may be stored for subsequent use (block 812).

After storing of the scores, the TAS 100 may determine if all capability-requirement scores have been generated (block 814). If scores have not been generated for all unique capability-requirement combinations, the next capability-requirement pair may be selected (block 815). The scoring may be performed for each unique capability-requirement combination of a single capability and a single requirement. Upon completion of scoring all capability-requirement pairs, the TAS 100 may filter the scores based on predetermined scoring threshold (block 816). Based on the filtered scores, selected capability model, and selected requirements list, the particular level of correspondence or level of similarity between capabilities and requirements may be determined (block 817). The TAS 100 may generate the visual representation 126 (block 818) based on the determined level of correspondence between the selected capability model and requirement list. The visual representation 126 may be transmitted to a display, such as the display 128 (block 820).

The TAS 100 may determine if any user input directed to editing the visual presentation has been received (block 822). If no input has been received, the TAS 100 may end operation or may remain in a paused state until receipt of further input. If editing is desired, as shown in FIG. 9, the edit information may be received by the TAS 100 (block 900). Upon receipt of the information, the TAS 100 may determine if the information is related to generating a new requirement (block 902). If the information is related to generating a new requirement, the requirement generator module 314 may receive input regarding a capability to be used for generation of new requirement (block 904). Upon receipt of the capability, the requirement generator module 314 may prompt for selection of a predetermined prefix (block 906). Upon receipt of the predetermined prefix (block 908), requirement generator module 314 may generate the new requirement based on the selected prefix, verb-entity extraction of the capability or through use of the text of the capability as described with regard to FIGS. 5 through 7 (block 910).

The generated requirement may be transmitted to the visual presentation generator 312 (block 912) and may generate an updated visual representation 504 (block 914). The visual presentation generator 312 may transmit the updated visual representation 504 to the display 128 (block 916). If the edit information is not related to generation of a new requirement, the edit input 400 may be processed by the edit module 313 (block 917). The edit module 313 may transmit the edit information 402 to the visual representation generator 312 (block 912). The visual representation generator 312 may generate an updated visual representation 404 (block 914) and transmit the updated visual representation 404 to the display 128 (block 916). Upon updating the visual representation, the TAS 100 may determine if another edit is desired (block 918). If another edit is desired, the TAS 100 may receive the additional edit information (block 900). If no additional edit is desired, no further operation may be taken by the TAS 100 until further information is received.

Figure 10:
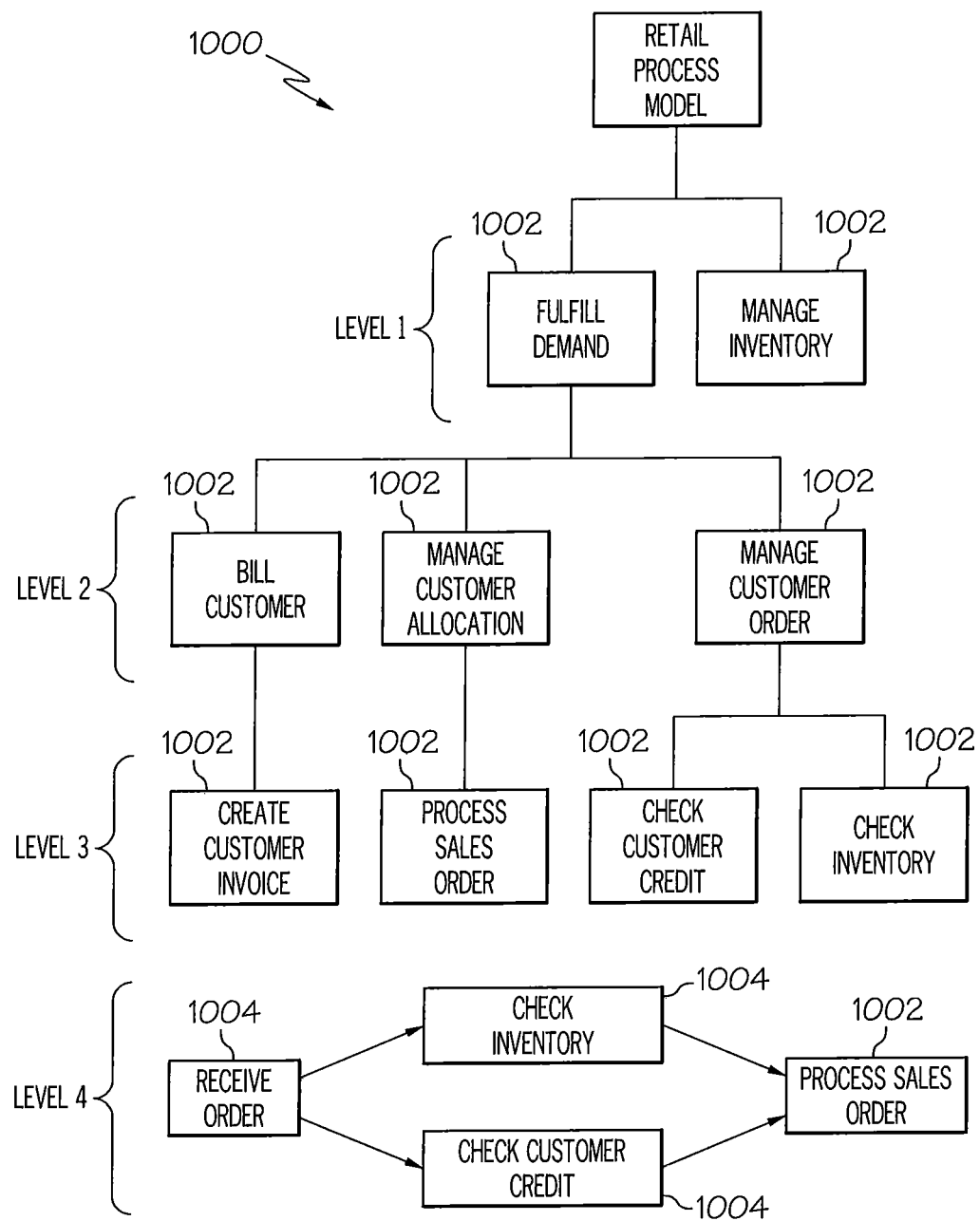
FIG. 10 is an example of a capability model.

Capability models 112 may include capabilities that may require other capabilities to be realized in order to be performed. For example, FIG. 10 is an example of a capability model 1000. The capability model 1000 is associated with the domain of retail, and in particular, is a "Retail Process Model" in FIG. 10. The capability model 1000 includes a number of hierarchical levels, levels 1 through 4, each including various capabilities 1002 and/or processes 1004. Level 4 includes processes that may require existence to realize a particular capability. For example, in FIG. 2 the processes 1004 "Receive Order," "Check Inventory," and "Check Customer Credit" may all be required in order for the capability of "Process Sales Order" to be realized. In other words, in order for the capability 1002 of "Process Sales Order" to be implemented in the capability model 1000, those processes of level 4 may be required to be implemented as well.

Such a relationship between capabilities and/or processes may cause issues when determining correspondence between capabilities of a capability model and requirements of a requirement list. For example, a particular capability may be found to correspond to a requirement in a requirements list. However, there may be no corresponding requirements for capabilities or processes that may be required to exist in order to implement the particular capability. As later described in detail, the RAS 100 may indicate when such conditions exist.

Figure 11:
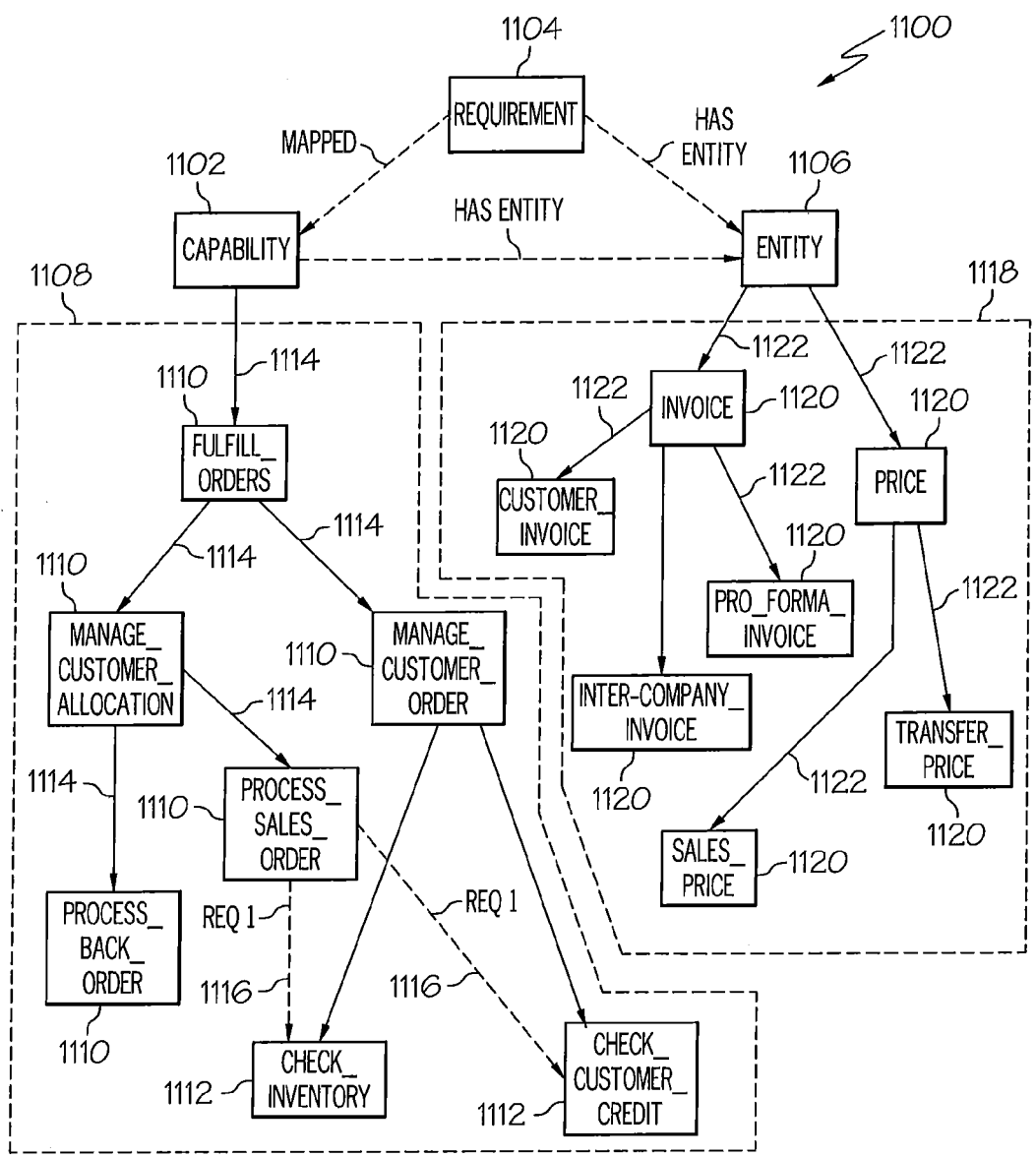
FIG. 11 is an example of a semantical graph representing a portion of the example capability model of FIG. 10.

Each capability model 112 may include the hierarchical information used to determine the hierarchies as illustrated in FIG. 10 or additional information may be supplied by a user via the GUI 120. For example, the hierarchical nature of the capability model 1000 may be expressed as a semantical graph. FIG. 11 is a partially-developed semantical graph 1100 representing the capability model 1000. The semantical graph 1100 expresses the general relationship between capabilities (box 1102) requirements (box 1104) and entities (box 1106). In one example, the capability model 1000 may be analyzed by the TAS 100 to extract the capabilities and entities contained in the capability model 1000 using resources such as OpenNLP. The TAS 100, based upon user input, may determine relationships between capabilities and processes present in a capability model 112. For example, the TAS 100 may receive user input via the GUI 120 indicated the relationships shown between the various capabilities and requirements of the capability model 100. Portion 1108 of the semantical graph 1100 may be created by the TAS 100 based on user input, which indicates relationships between specific capabilities and processes. In FIG. 11, specific capabilities in the capability model 1000 may each be designated as a box 1110 and the specific processes as a box 1112. The capabilities and processes may be positioned below the "Capability" box 1102.

The solid arrow lines 1114 in the semantical graph 1000 indicate a hierarchical relationship between capabilities and the dashed arrow lines 1116 indicated that the capability or process connected to the downstream end of the arrow may be required in order for the capability connected to the upstream end of the arrow. The term "req 1" indicates that the capability may require the associated process 1112, but other processes 1112 may also be required. The term "req" (not shown) may indicate that the associated capability or process is the only required one to realize a particular capability.

Based on the portion 1108 of the semantical graph, the TAS 100 may create portion 1118 of the semantical graph 1100. The TAS 100 may extract entities designated as boxes 1120 within the capability model (not shown) to determine various entities related to the capabilities of the capability model 1000, which may originate on the semantic graph 1100 from the "entity" box 1106. In FIG. 11, entities may have sub-entities. For example, the entity "invoice" may have sub-entities such as "intercompany invoice" and "pro form a invoice." The TAS 100 may generate the terms and relationships indicated by arrows 1122. In further development of the semantical graph, requirements (not shown) may be added and may be expressed as originating at the requirement box 1104 and branch out as shown with regard to portions 1108 and 1118. Further development of the semantical graph 1100 may also express direct relationships between capabilities and processes having associated entities. Mapped relationships between requirements and capabilities and processes may also be expressed in the semantical graph 1100.

As previously described, in determining correspondence between capabilities and requirements, correspondence between a particular capability and a requirement may exist, but realization of the particular capability may require other capabilities or processes not having corresponding requirements. Thus, identification of these other capabilities or process may allow a subsequent response such as generation of requirements corresponding to the other capabilities.

Figure 12:
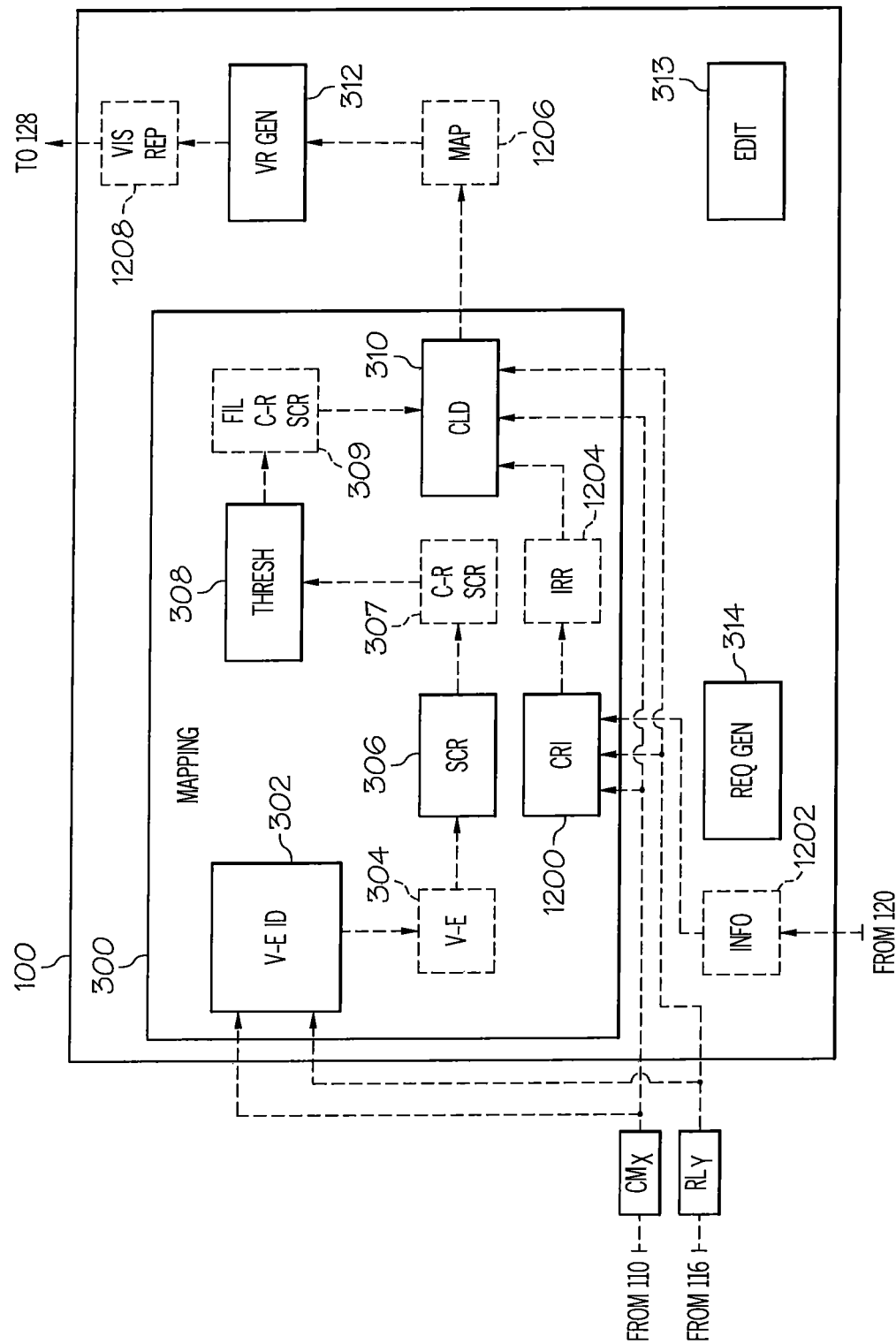
FIG. 12 is a block diagram of another example of the textual analysis module of FIG. 1.

In FIG. 12, the mapping module 300 may include a capability relationship identifier ("CRI") module 1200. The CRI module 1200 may receive the capability model $CM_X$ and requirements list $RL_Y$ to determine interrelationships between capabilities and processes included in the capability model $CM_X$, as well as between requirements and the capabilities and processes. The interrelationships may include mutual exclusivity or capabilities to that may require other the capabilities for their fulfillment based on predetermined constraints. The interrelationships determined by the CRI module 1200 may also be based on user-based input 1202 received via the GUI 120. Based on the received information, the CRI module 1200 may generate interrelationships between capabilities of the capability model $CM_X$, such as those shown in the semantical graph of FIG. 11.

The CRI module 1200 may generate an interrelationship ("IRR") data set 1204 containing the information regarding interrelationships between capabilities and processes. The interrelationship data set 1204 may be received by the correspondence level detector 310. As previously discussed, the correspondence level detector 310 may determine correspondence levels between the capabilities (and processes) of the capability model $CM_X$ and the requirements of the requirement list $RL_Y$. Based on the interrelationship data set 1204, the CRI module 1200 may determine correspondence levels involving the interrelationships between the capabilities of the capability model $CM_X$. For example, the correspondence level detector 307 may determine that while a particular capability corresponds to a particular requirement, other capabilities or processes necessary to realize the particular capability do not have corresponding requirements.

The correspondence level detector 310 may generate a mapping data set ("MAP") 1206 similar to the mapping data set 311. The mapping data set 1206 may also include information regarding the capability interrelationships. The visual representation generator module 312 may generate a visual representation 1208 to be transmitted to the display 128. The visual representation 1210 may be similar to the visual representation 126 and may also include information for visual indication of the capability interrelationships. For example, the visual representation 1208 may visually indicate capabilities requiring other capabilities or processes to be performed in order to be realized, in which the other capabilities do not have other processes or capabilities. Referring to FIG. 8, such activity as described with regard to FIG. 12 involving the CRT module 1200 and the correspondence level detector module 310 may be performed during the correspondence determination (block 817).

The TAS 100 may also determine dependencies between systems and capabilities. In one example, an organization may desire to use a particular system in order to perform some action or task. However, some desired systems may not include every capability required for implementation. Thus, a capability model substantially corresponding to a particular set of requirements describing the desired system may be disregarded by the organization for failure of including all desired capabilities. For example, if a software solution based on a particular capability model does have not have in-build support for tracking hazardous materials, then some other system that provides those capabilities may be required. The TAS 100 may use the dependencies between systems and capabilities of the capability models to allow creation of more focused requirement statements.

A system may be formally described based on the core capabilities of the system. For example, a billing system can be defined as system that must perform for all the following capabilities: 1) Create invoice; 2) Create credit memo; 3) Create demo; and 4) Process returned items. The formal description of systems, such as the described billing system, may be initially characterized by an organization as simply "the system" as the subject ((e.g., "the system shall allow the user to create invoices") when developing requirements. The TAS 100 may implement a reasoning engine, such as Jena, to guide an organization to change "system" to "billing system", for a set of requirements. Such action allows the TAS to map the set of requirements to the above capabilities involving the billing system providing a more focused set of requirements. Thus, if an organization indicates a desire to use the billing system, but not all the required capabilities have requirements mapped to them, the TAS 100 identify to which capabilities that may need to be included.

Figure 13:
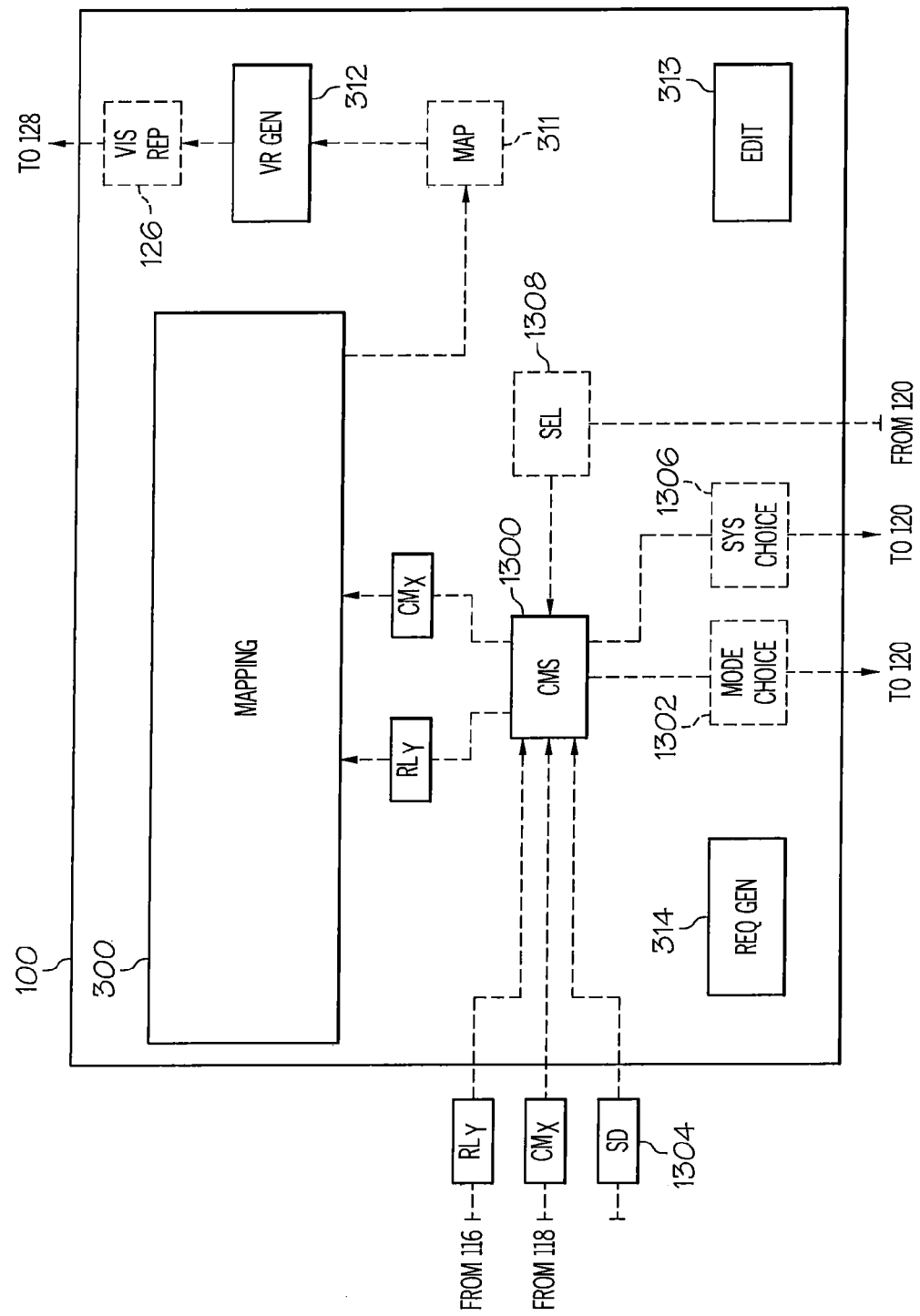
FIG. 13 is a block diagram of another example of the textual analysis module of FIG. 1

In one example, the TAS may select the capability model based on the set of requirements. In FIG. 13, the TAS 100 may include capability model selection ("CMS") module 1300. The CMS module 1300 may identify a particular capability model or group of capabilities within a particular capability model based on a preselected requirements list. In FIG. 13, the CMS module 1300 may be configured to receive a particular requirements list $RL_Y$, such as through user input via the GUI 120. The CMS module 1300 may provide a mode choice 1302 allowing a user the opportunity to select the capability model 112 for comparison or to allow the CMS 1300 to select the capability model. If the CMS 1300 is chosen to select the capability model, the CMS 1300 may analyze the requirements list $RL_Y$. The CMS 1300 may also retrieve a system definition data set 1304 stored in one or more databases, such as databases 108 and 114 or stored on the memory 106. The system definition ("SD") data set 1304 may include terminology associated with known system types. For example, a requirement of the requirements list $RL_Y$ may provide "the system shall allow the user to create invoices." The system definitions data set 1304 may include information that relates "invoices" to other system types such as a billing system. The CMS module 1300 may provide a user a system choice 1306 indicating capability models 112 available for selection that correspond to one or more requirements in the requirements list $RL_Y$. Upon receipt of the selection 1308 via the GUI 120, the CMS module 1300 may retrieve the selected capability model $CM_X$. The requirements list $RL_Y$ and selected capability model $CM_X$ may be provided to the mapping module 300.

The mapping module 300 may allow generate the visual representation 126 as described with regard to FIGS. 1-7. The RAS 100 may allow a user to update requirements of the requirement list $RL_Y$, such as through the edit module 313, to reflect the particular system type associated with the selected capability model $CM_X$, which may be visually indicated in the visual presentation 126

In other examples, a capability model $CM_X$ including various capabilities or capability groups that describe particular system types. Upon selection of the capability model $CM_X$, the CMS module 1300 may identify particular systems described by capabilities within the selected capability model 1300. The CMS module 1300 may receive a user-based selection of a particular system type described in the capability mode to allow that system type may be selected based on user input. Upon selection, the CMS module 1300 may analyze the particular system chosen and may update the requirements of the requirement list RLY to reflect the particular system type chosen.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

We claim:

1. A system for textual similarity identification, the system comprising:
    a database configured to store a first set of textual statements and a second set of textual statements;
    a textual analysis module stored in a memory and executable on a processor to:
        retrieve the first set of textual statements and the second set of textual statements from the database;
        generate a plurality of statement pairs, wherein each statement pair of the plurality of statement pairs includes a textual statement from the first set and a textual statement from the second set;
        identify, for each statement pair, a first verb-entity pair from textual content of the textual statement of the first set and a second verb-entity pair from textual content of the textual statement of the second set;
        determine a respective score for each statement pair, wherein the respective score is indicative of a level of similarity between textual content of the textual statement of the first set and textual content of the textual statement of the second set;
        compare each respective score to a predetermined scoring threshold; and
        generate a visual representation configured to be viewed on a display, wherein the visual representation is configured to visually indicate when each statement pair has a respective score greater than the predetermined scoring threshold.

2. The system of claim 1, wherein the textual analysis module is further executable to:
    determine a plurality of sub-scores for each statement pair, wherein each sub-score is based on the textual content of the textual statement of the first set and the textual content of textual statement of the second set of a respective statement pair;
    determine a first respective score, for each statement pair, wherein the first respective score is selected as a maximum score of the plurality of sub-scores of the respective statement pair;
    determine a second respective score for each statement pair, wherein the second respective score is based on the plurality of sub-scores; and
    select a respective final score for each statement pair based on the first respective score and the second respective score.

3. The system of claim 2, wherein the textual analysis module is further executable to compare the selected final respective score to the predetermined scoring threshold, and wherein the visual representation is configured to visually indicate each statement pair having a respective final score greater than the predetermined scoring threshold.

4. The system of claim 2, wherein, for each statement pair, a first one of the plurality of sub-scores is based on similarity of syntax between the textual content of the textual statement of the first set and the textual content of the textual statement of the second set, and a second one of the plurality of sub-scores is based on one of presence of synonymous textual content of the textual statement of the first set with respect to the textual content of the textual statement of the second set for each respective statement pair and semantical similarity between the textual content of the textual statement of the first set and the textual content of the textual statement of the second set for each respective statement pair.

5. The system of claim 2, wherein the first respective score for each respective statement pair is the greater of a third respective score and a fourth respective score for the respective statement pair.

6. The system of claim 5, wherein the third respective score, for each statement pair, is based on a comparison between a stem of at least one word of the textual statement of the first set and at least one word of the textual statement of the second set.

7. The system of claim 5, wherein the fourth respective score, for each statement pair, is based on a semantical similarity between the textual statement of the first set and the textual statement of the second set.

8. An organization analysis system comprising:
    a database configured to store:
        a plurality of capability models, wherein each of the plurality of capability models comprises a plurality of capabilities, wherein each of the capabilities defines a particular aspect associated with a desired operational aspect of an organization;

a plurality of requirement lists, wherein each requirement list of the plurality of requirement lists comprises a plurality of requirements, wherein each of the requirements defines an operational aspect of the organization;

a textual analysis system stored on a memory and executable by a processor, the textual analysis system configured to:

retrieve a capability model from the plurality of capability models;

retrieve a requirement list from the plurality of requirement lists;

identify, for each unique combination of a capability and requirement, a first verb-entity relationship in a single capability and a second verb-entity relationship in a single requirement;

determine a level of similarity between the capability and the requirement for each unique combination; and generate at least one visual presentation, wherein at least one visual representation is generated to visually indicate each determined level of similarity between the single capability and the single requirement of each unique combination.

9. The organization analysis system of claim 8, wherein the textual analysis system is further configured to:

generate a respective score, for each unique combination, based on the level of similarity between a single capability and a single requirement;

compare the respective score for each unique combination to a predetermined scoring threshold; and determine, for each unique combination, a respective level of correspondence between the single capability and the single requirement based on comparison of the respective score to the predetermined scoring threshold, wherein the at least one visual presentation is generated to visually indicate the respective level of correspondence for each unique combination.

10. The organization analysis system of claim 9, wherein the textual analysis system is further configured to determine direct correspondence based on the respective level of correspondence for each unique combination, wherein the visual presentation is configured to visually indicate direct correspondence between the single capability and the single requirement of each unique combination.

11. The organization analysis system of claim 9, wherein the textual analysis system is further configured to identify a first hierarchy associated with the plurality of capabilities of the retrieved capability model and a second hierarchy associated with the plurality of requirements of the retrieved requirement list, wherein the respective level of correspondence is between the single capability and the single requirement of each unique combination is determined based on the first hierarchy and the second hierarchy.

12. The organizational analysis system of claim 8, wherein the textual analysis system is further configured to generate a new requirement based on selection of a capability from the retrieved capability model.

13. The organizational analysis system of claim 12, wherein the textual analysis system is configured to update the visual representation to visually indicate the generation of the new requirement.

14. The organizational analysis system of claim 13, wherein the textual analysis system is configured to add the new requirement to at least one of the plurality of requirement lists.

15. The organization analysis system of claim 8, wherein the organization analysis system further executable to:

eliminate at least one requirement from the retrieved requirement list to generate a new requirement list; and store the new requirement list in the database.

16. A computer-readable medium comprising a plurality of instructions executable by a processor, the computer-readable medium comprising:

instructions to retrieve a first electronic document containing a first plurality of statements;

instructions to retrieve a second electronic document containing a second plurality of statements;

instructions to generate a plurality of statement pairs, wherein each statement pair includes a first respective statement from the first plurality of statements and a second respective statement from the second plurality of statements;

instructions to identify, for each statement pair, a verb-entity relationship from the first respective statement and a verb-entity relationship from the second respective statement;

instructions to determine, for each statement pair, a level of similarity between the verb-entity relationship from the first respective statement and the verb-entity relationship from the second respective statement; and instructions to generate a visual representation configured to be generated on at least one display, wherein the visual representation is generated to visually indicate the level of similarity for each respective statement pair.

17. The computer-readable medium of claim 16, further comprising:

instructions to compare the verb-entity relationship from the first respective statement and the verb-entity relationship of the second respective statement, wherein the instructions to determine, a level of similarity for each of the statement pairs comprise instructions to generate a score based on the comparison of the verb-entity relationship from the first respective statement and the verb-entity relationship from the second respective statement, wherein the score is indicative of a level of similarity between the verb-entity relationship from the first respective statement and the verb-entity relationship from the second respective statement.

18. The computer-readable medium of claim 17, wherein the instructions to generate a score comprise generating a score based on:

a comparison between a verb of the verb-entity relationship of the first respective statement and a verb of the verb-entity relationship of the second respective statement; and a comparison between an entity of the verb-entity relationship of the first respective statement and an entity of the verb-entity relationship of the second respective statement.

19. The computer-readable medium of claim 18, wherein the instructions to generate a score further comprise generating a score based on the verb of the verb-entity relationship of the first respective statement and the verb of the verb-entity relationship of the second respective statement being synonyms.

20. The computer-readable medium of claim 18, wherein the instructions to generate a score further comprise generating a score based on the entity of the verb-entity relationship of the first respective statement and the entity of the verb-entity relationship of the second respective statement being synonyms.

21. The computer-readable medium of claim 18, wherein the instructions to generate a score further comprise generating a score based on the verb of the verb-entity relationship of the first respective statement and the verb of the verb-entity relationship of the second respective statement sharing a common stem word.

22. The computer-readable medium of claim 18, wherein the instructions to generate a score further comprise generating a score based on the entity of the verb-entity relationship of the first respective statement and the entity of the verb-entity relationship of the second respective statement sharing a common stem word.

* * * * *